United States Patent
Jeong et al.

(10) Patent No.: US 11,681,157 B2
(45) Date of Patent: Jun. 20, 2023

(54) CAMERA MODULE AND PORTABLE ELECTRONIC DEVICE INCLUDING THE SAME

(71) Applicant: SAMSUNG ELECTRO-MECHANICS CO., LTD., Gyeonggi-do (KR)

(72) Inventors: Dae Hyun Jeong, Suwon-si (KR); Oh Byoung Kwon, Suwon-si (KR); Gab Yong Kim, Suwon-si (KR); Young Bok Yoon, Suwon-si (KR); Bo Sung Seo, Suwon-si (KR); Young Hwan Kwon, Suwon-si (KR); Jun Sup Shin, Suwon-si (KR); Nam Ki Park, Suwon-si (KR); Ik Jin Jang, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 141 days.

(21) Appl. No.: 17/147,751

(22) Filed: Jan. 13, 2021

(65) Prior Publication Data
US 2022/0003958 A1 Jan. 6, 2022

(30) Foreign Application Priority Data

| Apr. 3, 2020 | (KR) | 10-2020-0040953 |
| May 12, 2020 | (KR) | 10-2020-0056752 |
| Jun. 30, 2020 | (KR) | 10-2020-0080548 |

(51) Int. Cl.
*G02B 27/64* (2006.01)
*G02B 7/02* (2021.01)
(Continued)

(52) U.S. Cl.
CPC ............. *G02B 27/646* (2013.01); *G02B 7/02* (2013.01); *G03B 5/00* (2013.01); *G03B 30/00* (2021.01); *G03B 2205/0007* (2013.01)

(58) Field of Classification Search
CPC .......... G02B 7/02; G02B 27/646; G02B 7/08; G02B 27/64; G03B 5/00; G03B 30/00;
(Continued)

(56) References Cited

U.S. PATENT DOCUMENTS

| 10,527,866 B2 | 1/2020 | Chung et al. |
| 2015/0103195 A1 | 4/2015 | Kwon et al. |

(Continued)

FOREIGN PATENT DOCUMENTS

| CN | 104428711 A | 3/2015 |
| CN | 104570547 A | 4/2015 |

(Continued)

OTHER PUBLICATIONS

Machine Translation of CN-112059537-A (Year: 2020).*
(Continued)

*Primary Examiner* — Darryl J Collins
*Assistant Examiner* — Matthew Y Lee
(74) *Attorney, Agent, or Firm* — NSIP Law

(57) ABSTRACT

A camera module includes a lens module, a first frame accommodating the lens module, a second frame accommodating the first frame, and a housing accommodating the second frame. The lens module and the first frame are rotatable about a first axis, with respect to the second frame, perpendicular to an optical axis. The lens module, the first frame, and the second frame are rotatable about a second axis, with respect to the housing, perpendicular to both the optical axis and the first axis. A first ball member is disposed between the first frame and the second frame and elastically supported in a direction of the first axis, and a second ball (Continued)

member is disposed between the second frame and the housing and elastically supported in a direction of the second axis.

20 Claims, 38 Drawing Sheets

(51) Int. Cl.
*G03B 5/00* (2021.01)
*G03B 30/00* (2021.01)

(58) Field of Classification Search
CPC .............. G03B 2205/0007; G03B 5/06; G03B 2205/0023; H04N 5/2253; H04N 5/2254; H04N 5/2257; H04N 5/23287
See application file for complete search history.

(56) References Cited

U.S. PATENT DOCUMENTS

| | | | |
|---|---|---|---|
| 2015/0207968 A1 | 7/2015 | Yeo | |
| 2015/0296143 A1 | 10/2015 | Kang et al. | |
| 2015/0346587 A1 | 12/2015 | Lim et al. | |
| 2015/0373272 A1 | 12/2015 | Lim et al. | |
| 2016/0241786 A1 | 8/2016 | Minamisawa | |
| 2017/0176766 A1* | 6/2017 | Sue | G02B 27/646 |
| 2017/0273171 A1* | 9/2017 | Codd | H05K 1/028 |
| 2018/0180900 A1* | 6/2018 | Chung | G02B 27/646 |
| 2018/0321506 A1* | 11/2018 | Minamisawa | H04N 5/23264 |
| 2020/0012068 A1* | 1/2020 | Lim | G03B 17/02 |
| 2021/0281729 A1* | 9/2021 | Queeney | G03B 19/22 |
| 2021/0325630 A1* | 10/2021 | Yang | G03B 13/36 |

FOREIGN PATENT DOCUMENTS

| | | | | |
|---|---|---|---|---|
| CN | 104977776 A | | 10/2015 | |
| CN | 105319803 A | | 2/2016 | |
| CN | 108259716 A | | 7/2018 | |
| CN | 112059537 A | * | 12/2020 | .......... G02B 27/646 |
| JP | 6143622 B2 | | 6/2017 | |
| KR | 10-2012-0110436 A | | 10/2012 | |
| KR | 10-2015-0145682 A | | 12/2015 | |
| KR | 10-2017-0106185 A | | 9/2017 | |
| KR | 10-2018-0076790 A | | 7/2018 | |
| KR | 10-2009197 B1 | | 8/2019 | |

OTHER PUBLICATIONS

Korean Office Action dated Aug. 3, 2021, in counterpart Korean Patent Application No. 10-2020-0080548 (6 pages in English and 5 pages in Korean).

Chinese Office Action dated Nov. 30, 2022, in counterpart Chinese Patent Application No. 202110345752.1 (8 pages in English, 8 pages in Chinese).

* cited by examiner

III-III'

CAMERA MODULE AND PORTABLE ELECTRONIC DEVICE INCLUDING THE SAME

CROSS-REFERENCE TO RELATED APPLICATION(S)

This application claims the benefit under 35 USC 119(a) of Korean Patent Application No. 10-2020-0040953 filed on Apr. 3, 2020, Korean Patent Application No. 10-2020-0056752 filed on May 12, 2020, and Korean Patent Application No. 10-2020-0080548 filed on Jun. 30, 2020 in the Korean Intellectual Property Office, the entire disclosures of which are incorporated herein by reference for all purposes.

BACKGROUND

1. Field

The present disclosure relates to a camera module and a portable electronic device including the same.

2. Description of the Background

Cameras have been employed in mobile communications terminals such as smartphones, tablet PCs, laptop computers, and the like.

To perform focusing and shake compensation, a camera module is provided with an actuator moving a lens module. Conventionally, an actuator moves a lens module in an optical axis direction and a direction, perpendicular to an optical axis, using driving force generated by a magnet and a coil.

However, shake does not always occur in a camera module in a direction perpendicular to an optical axis. Therefore, when a lens module is moved in a direction perpendicular to an optical axis, there is a limitation in shake compensation.

In particular, when shake continuously occurs (for example, when capturing moving images), it may be difficult to precisely compensate for the shake.

In addition, when a subject, an imaging target, is moved during capturing of moving images, a user should move a mobile communications terminal to set a capturing direction of a camera module to that of the moving subject, which may be inconvenient.

The above information is presented as background information only to assist in an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a camera module, capable of tracking a subject, and a portable electronic device including the camera module.

In one general aspect, a camera module includes a lens module, a first frame accommodating the lens module, a second frame accommodating the first frame, and a housing accommodating the second frame. The lens module and the first frame are configured to be rotatable about a first axis, with respect to the second frame, perpendicular to an optical axis. The lens module, the first frame, and the second frame are configured to be rotatable about a second axis, with respect to the housing, perpendicular to both the optical axis and the first axis. A first ball member is disposed between the first frame and the second frame and elastically supported in a direction of the first axis, and a second ball member is disposed between the second frame and the housing and elastically supported in a direction of the second axis.

The camera module may include a connection substrate portion having a first part coupled to the housing and a second part coupled to the lens module, and at least a portion of the connection substrate portion may be flexibly configured to support a rotation of the lens module.

The connection substrate portion may include a first base substrate coupled to the housing, a second base substrate coupled to the lens module, and a connection substrate connecting the first base substrate to the second base substrate. The connection substrate may surround at least three side surfaces of the second substrate when viewed in a direction of the optical axis.

The second base substrate may be disposed above the first base substrate in the direction of the optical axis, and at least a portion of the connection substrate may be inclined.

The connection substrate may include a plurality of layers disposed spaced apart from each other in the direction of the optical axis.

The connection substrate may include a first extension portion, a branch portion, a second extension portion, and a bent portion. The first extension portion may extend from the second base substrate, the branch portion may extend from both sides of the first extension portion, the second extension portion may extend from the branch portion, and the bent portion may have a bent shape, may extend from the second extension portion, and may be connected to the first base substrate.

A first support member may be disposed in the first frame, a first damper member may be disposed in the second frame, and the first ball member may be pressed between the first support member and the first damper member. A second support member may be disposed in the second frame, a second damper member may be disposed in the housing, and the second ball member may be pressed between the second support member and the second damper member.

Each of the first damper member and the second damper member may include a buffer portion having elastic force.

Each of the first support member and the second support member may include a metal material, a first accommodation groove, accommodating the first ball member, may extend from the first support member, and a second accommodation groove, accommodating the second ball member, may extend from the second support member.

The first support member may be integrated with the first frame such that the first accommodation groove is exposed outwardly of the first frame, and the second support member may be integrated with the second frame such that the second accommodation groove is exposed outwardly of the second frame.

The camera module may include a first driving portion disposed between the first frame and the second frame. The first driving portion may include a first magnet, disposed on the first frame, and a first coil and a first position measurement unit disposed to face the first magnet. The first magnet may have an internal side surface, facing the first axis, and an external side surface opposing the internal side surface, and the internal side surface and the external side surface of the first magnet may be rounded.

An inscribed circle, in contact with the internal side surface of the first magnet, and a circumscribed circle, in contact with the external side surface of the first magnet, may be concentric circles.

A first substrate may be mounted on the second frame, and the first coil may be disposed on the first substrate. The first substrate may include a connection portion for electrical connection to an external substrate, and the connection portion may be bent.

The camera module may include a second driving portion disposed between the second frame and the housing. The second driving portion may include a second magnet, disposed on the second frame, and a second coil and a second position measurement unit disposed to face the second magnet. The second magnet may have an internal side surface, facing the second axis, and an external side surface opposing the internal side surface, and the internal side surface and the external side surface of the second magnet may be rounded.

An inscribed circle, in contact with the internal side surface of the second magnet, and a circumscribed circle, in contact with the external side surface of the second magnet, may be concentric circles.

A second substrate may be mounted on the housing, and the second coil may be disposed on the second substrate.

The lens module may include an image sensor having a rectangular shape, and a rotation range of the lens module when a minor axis is a rotation axis of the image sensor may be wider than a rotation range when a major axis of the image sensor is a rotation axis of the image sensor.

The major axis may be formed in the direction of the first axis, and the minor axis may be formed in the direction of the second axis. The rotation range of the lens module when the first axis is the rotation axis may be ±7 degrees, and the rotation range of the lens module when the second axis is the rotation axis may be ±15 degrees.

In another general aspect, a portable electronic device includes a first camera module and a second camera module spaced apart from the first camera module. The first camera module has a field of view narrower than a field of view of the second camera module. The first camera module includes a lens module, a first frame accommodating the lens module, a second frame accommodating the first frame, and a housing accommodating the second frame. The lens module and the first frame are configured to be rotatable about a first axis, with respect to the second frame, perpendicular to an optical axis. The lens module, the first frame, and the second frame are configured to be rotatable about a second axis, with respect to the housing, perpendicular to both the optical axis and the first axis. A first ball member is disposed between the first frame and the second frame and pressed in a direction of the first axis, and a second ball member is provided between the second frame and the housing and pressed in a direction of the second axis.

In another general aspect, a camera module includes a fixed body; a first movable body disposed in the fixed body and configured to rotate about a first axis that is perpendicular to an optical axis; a second movable body including at least one lens, the second movable body being disposed in the first movable body and configured to rotate about a second axis that is perpendicular to the first axis and the optical axis, and configured to be rotated together with the first movable body about the first axis; a first ball member disposed between the fixed body and the first movable body and configured to maintain contact with the fixed body and the first movable body; and a second ball member disposed between the first movable body and the second movable body and configured to maintain contact with the fixed body and the first movable body.

The camera module may include a first cover coupled to the fixed body, and the first cover may include a first elastic member configured to contact the first movable body to allow the first ball member to maintain contact with the fixed body and the first movable body.

The camera module may include a second cover coupled to the first movable body, and the second cover may include a second elastic member configured to contact the second movable body to allow the second ball member to maintain contact with the first movable body and the second movable body.

Other features and aspects will be apparent from the following detailed description, the drawings, and the claims.

BRIEF DESCRIPTION OF DRAWINGS

FIGS. 10A, 10B, and 100 are views illustrating that a lens module and a first frame rotate about a first axis.

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
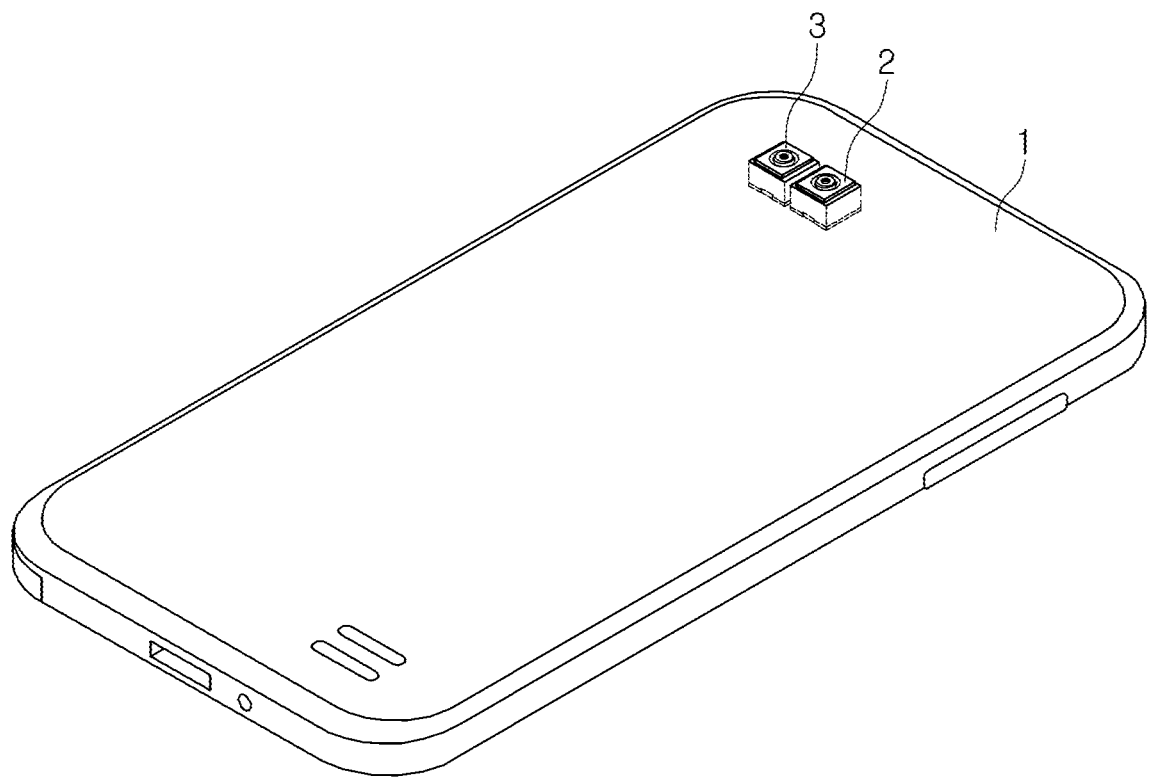
FIG. 1 is a perspective view of a portable electronic device according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

Figure 2:
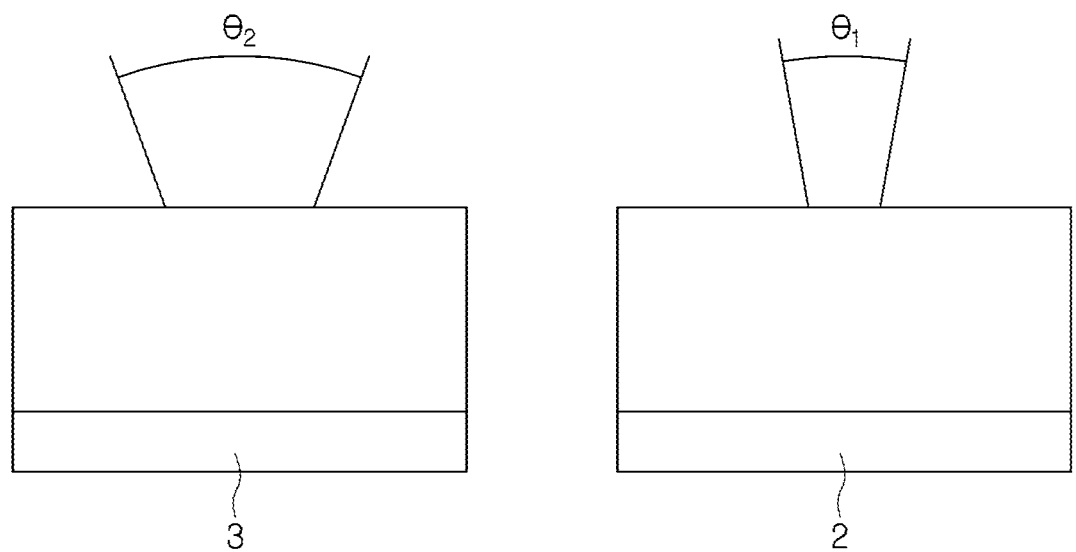
FIG. 2 is a side view of a plurality of camera modules mounted in a portable electronic device.

FIG. 1 is a perspective view of a portable electronic device according to an example, and FIG. 2 is a side view of a plurality of camera modules mounted in a portable electronic device.

A portable electronic device 1 may be, for example, a mobile communications terminal, a smartphone, a tablet PC, or the like.

As illustrated in FIG. 1, the portable electronic device 1 may be provided with a plurality of camera modules to capture a subject. As an example, a portable electronic device may be provided with a first camera module 2 and a second camera module 3. For example, a dual camera module, including a first camera module 2 and a second camera module 3, may be mounted in the portable electronic device 1.

The first camera module 2 and the second camera module 3 may be configured to have different fields of view (FOV).

The first camera module 2 may be configured to have a relatively narrow field of view (for example, telephoto), and the second camera module 3 may be configured to have a relatively wide field of view (for example, a wide angle).

As an example, a field of view $\Theta_1$ of the first camera module 2 may range from 9 degrees to 35 degrees, and a field of view $\Theta_2$ of the second camera module 3 may range from 60 degrees to 120 degrees.

As described above, fields of view of camera modules may be designed to be different from each other, and thus, an image of a subject may be captured at various depths of field.

The portable electronic device 1 according to an example may have a picture-in-picture (PIP) function.

As an example, the portable electronic device 1 may display an image, captured by a camera module having a narrower field of view (for example, the first camera module 2), in an image captured by a camera module having a wider field of view (for example, the second camera module 3).

For example, a subject of interest may be imaged at a narrow field of view (thus, the subject of interest is enlarged) to be displayed in an image captured at a wide field of view.

Since a subject of interest may be moved when moving images are captured, an optical axis (a Z-axis) may rotate such that a camera module having a narrower field of view (for example, the first camera module 2) may image the subject of interest according to the movement of the subject.

Figure 4:
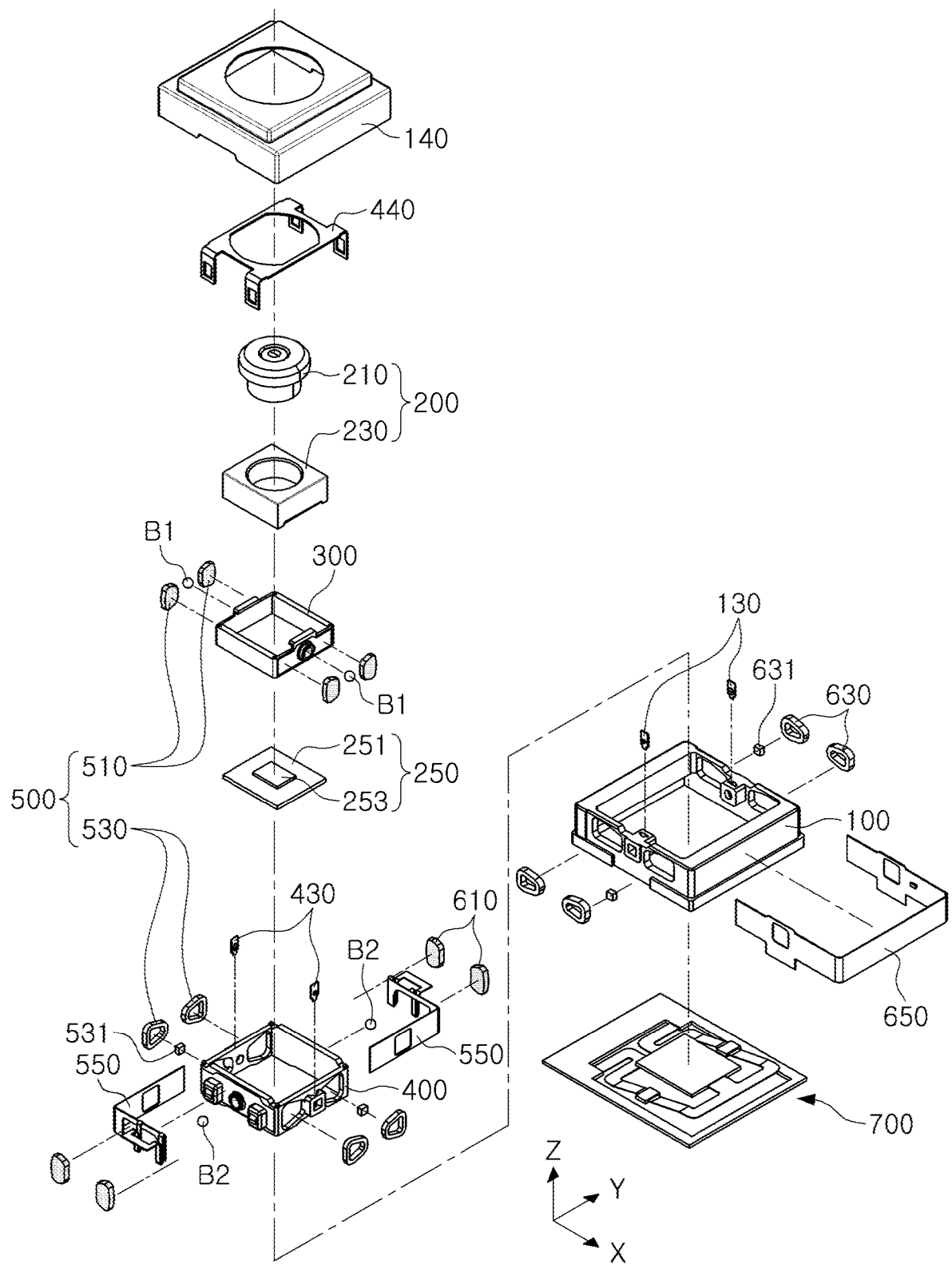
FIG. 4 is an exploded perspective view of a camera module according to an example.

For example, the first camera module 2 may track the movement of the subject of interest to rotate and move the lens module 200 (see FIG. 4, for example).

As an example, the lens module 200 provided in the first camera module 2 may rotate about a first axis (an X-axis) and a second axis (a Y-axis).

A range, in which the lens module 200 rotates about the first axis (the X-axis), may be different from a range in which the lens 200 rotates about the second axis (the Y-axis).

The lens module 200 may include an image sensor 251. Since the image sensor 251 has a rectangular shape, the image sensor 251 has a major axis and a minor axis. The major axis of the image sensor 251 is formed in a first axis (X-axis) direction, and the minor axis of the image sensor 251 may be formed in a second axis (Y-axis) direction.

When the lens module 200 rotates about the first axis (the X-axis), the range of a rotation angle of the lens module 200 is ±7 degrees.

When the lens module 200 rotates about the second axis (the Y-axis), the range of the rotation angle of the lens module 200 is ±15 degrees.

For example, a rotation range when the minor axis of the image sensor 251 is a rotation axis is wider than a rotation range when the major axis of the image sensor 251 is a rotation axis.

In addition, the lens module 200 provided in the first camera module 2 may rotate in the first axis (the X-axis) and the Y-axis (the Y-axis) to compensate for shake which may occur when capturing an image.

The first axis (the X-axis) may refer to an axis, perpendicular to an optical axis (a Z-axis), and the second axis (the Y-axis) may refer to an axis, perpendicular to both the optical axis (the Z-axis) and the first axis (the X-axis). In addition, the first axis (the X-axis) and the second axis (the Y-axis), axes of the lens module 200, may intersect each other, and the optical axis (the Z-axis), the first axis (the X-axis), and the second axis (the Y-axis) may intersect at one point.

Hereinafter, the first camera module 2 will be described in detail with reference to FIGS. 3 to 37B.

In FIGS. 3 to 37B, the first camera module 2 may be referred to as a "camera module."

Figure 3:
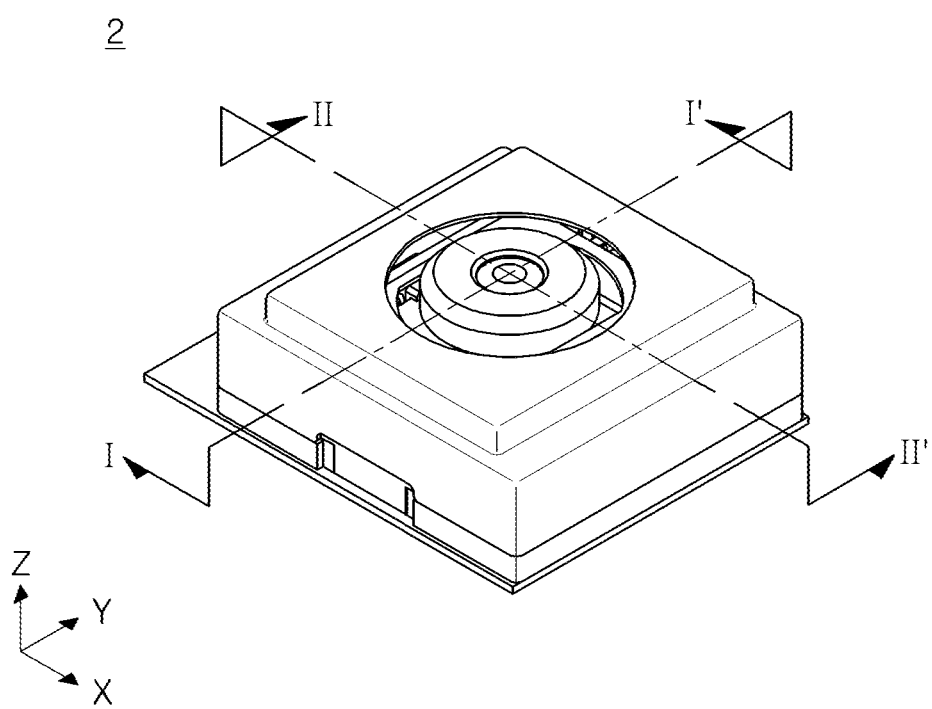
FIG. 3 is a perspective view of a camera module according to an example.

FIG. 3 is a perspective view of a camera module according to an example, and FIG. 4 is an exploded perspective view of a camera module according to an example.

Referring to FIGS. 3 and 4, the camera module 2 according to an example may include a lens module 200, a first frame 300, a second frame 400, a housing 100, and a case 140.

The lens module 200 may be accommodated in the first frame 300, the first frame 300 may be accommodated in the second frame 400, and the second frame 400 may be accommodated in the housing 100.

Each of the housing 100 and the case 140 may be a fixed member.

The first frame 300 may rotate about the first axis (the X-axis). Since the lens module 200 is mounted in the first frame 300, the lens module 200 may rotate about the first axis (the X-axis) together with the first frame 300.

The second frame 400 may rotate about the second axis (the Y-axis).

Since the first frame 300 is accommodated in the second frame 400 and the lens module 200 is accommodated in the first frame 300, the lens module 200 and the first frame 300 may rotate about the second axis (the Y-axis) together with the second frame 400.

The lens module 200 may include a lens unit 210 and a holder 230. The lens unit 210 may refer to a lens barrel, but the configuration is not limited thereto. For example, the lens unit 210 may refer to a form in which a lens barrel and a carrier are coupled to each other.

At least one lens for capturing a subject may be accommodated in the lens unit 210. When a plurality of lenses is disposed, the lenses are mounted inside the lens unit 210 along the optical axis (the Z-axis).

The lens unit 210 may be accommodated in the holder 230. As an example, the holder 230 may have a shape with open top and bottom, and the lens unit 210 may be accommodated in an internal space of the holder 230.

The lens module 200 may further include an image sensor module 250 disposed below the holder 230.

The image sensor module 250 may be configured to convert light, incident through the lens unit 210, into an electrical signal.

As an example, the image sensor module 250 may include an image sensor 251 and a printed circuit board 253 connected to the image sensor 251, and may further include an infrared filter.

The infrared filter may serve to block light in an infrared region in the light incident through the lens unit 210.

The image sensor 251 may convert the light, incident through the lens unit 210, into an electrical signal. As an example, the image sensor 251 may be a charge-coupled device (CCD) or a complementary metal-oxide semiconductor (CMOS).

The electrical signal, converted by the image sensor 251, may be output as an image through a display unit of the portable electronic device 1.

The image sensor 251 may be fixed to the printed circuit board 253, and may be electrically connected to the printed circuit board 253 by wire bonding.

The image sensor 251 may be in the form of a rectangle, and may have a major axis and a minor axis. The major axis of the image sensor 251 may be formed in the first axis (X-axis) direction, and the minor axis of the image sensor 251 may be formed in the second axis (Y-axis) direction.

The lens unit 210 may be moved in the optical axis (Z-axis) direction. As an example, the lens unit 210 may be moved relatively to the holder 230, in the optical axis (Z-axis) direction.

For example, the lens unit 210 may be moved with respect to the holder 230, in the optical axis (Z-axis) direction, to adjust a focus.

An actuator or a piezoactuator, including a magnet and a coil, may be used to move the lens unit 210 in the optical axis (Z-axis) direction. As an example, the lens unit 210 may be provided with a magnet, and the holder 230 may be provided with a coil.

Accordingly, the lens unit 210 may be moved with respect to the holder 230 in the optical axis (Z-axis) direction by driving force of an actuator.

The lens module 200 may be accommodated in the first frame 300. The first frame 300 may have a box shape with open top and bottom. The lens module 200 may be fixed to the first frame 300 using an adhesive, or the like.

The first frame 300 may rotate about the first axis (the X-axis), perpendicular to the optical axis (the Z-axis) ("pitching"). Since the lens module 200 is accommodated in the first frame 300, the lens module 200 may also rotate in the first axis (X-axis) direction together with the first frame 300 as the first frame 300 rotates.

The rotation of the first frame 300 about the first axis (the X-axis) will be described later with reference to FIGS. 5 to 10C.

The second frame 400 may be accommodated in the housing 100. Each of the second frame 400 and the housing 100 may have a box shape with open top and bottom.

The second frame 400 may rotate about the second axis (the Y-axis), perpendicular to both the optical axis (the Z-axis) and the first axis (the X-axis) ("yawing"). Since the first frame 300 may be accommodated in the first frame 300 and the lens module 200 is accommodated in the first frame 300, the lens module 200 and the first frame 300 may also rotate about the second axis (the Y-axis) together with the second frame 400 as the second fame 400 rotates.

The rotation of the second frame 400 about the second axis (the Y-axis) will be described later with reference to FIGS. 12A to 16C.

The case 140 may be coupled to the housing 100 to cover the housing 100. In addition, a connection substrate portion 700 may be coupled to a lower portion of the housing 100.

Figure 5:
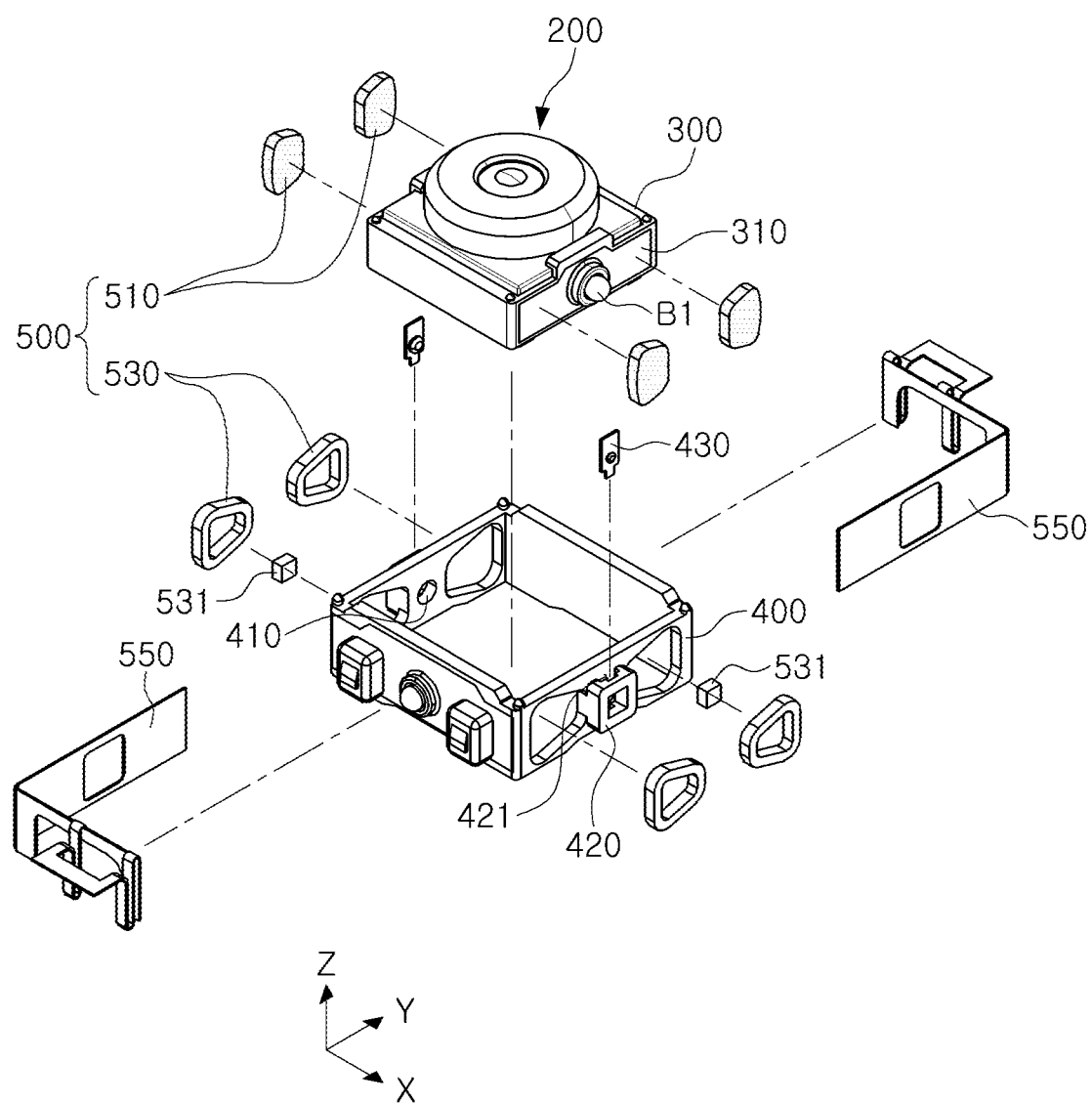
FIG. 5 is a schematic explode perspective view of a lens module, a first frame, and a second frame.
Figure 6:
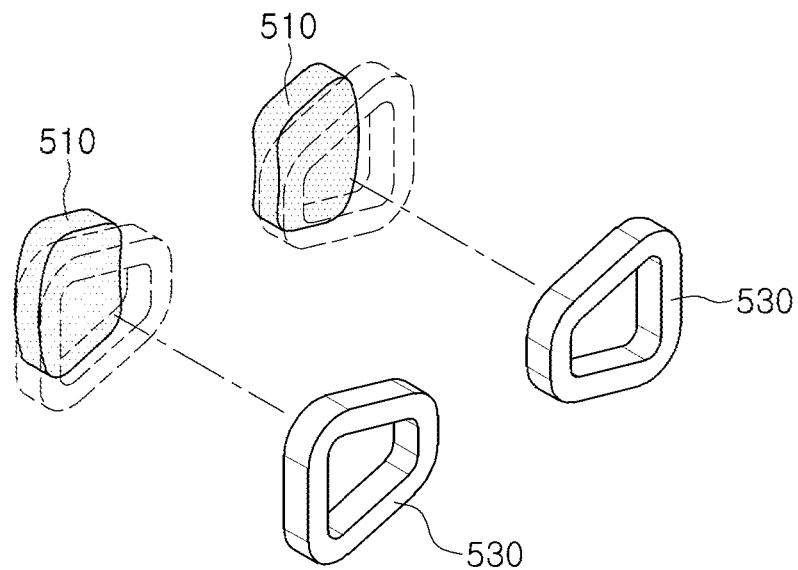
FIG. 6 is a perspective view of a first driving unit.
Figure 7:
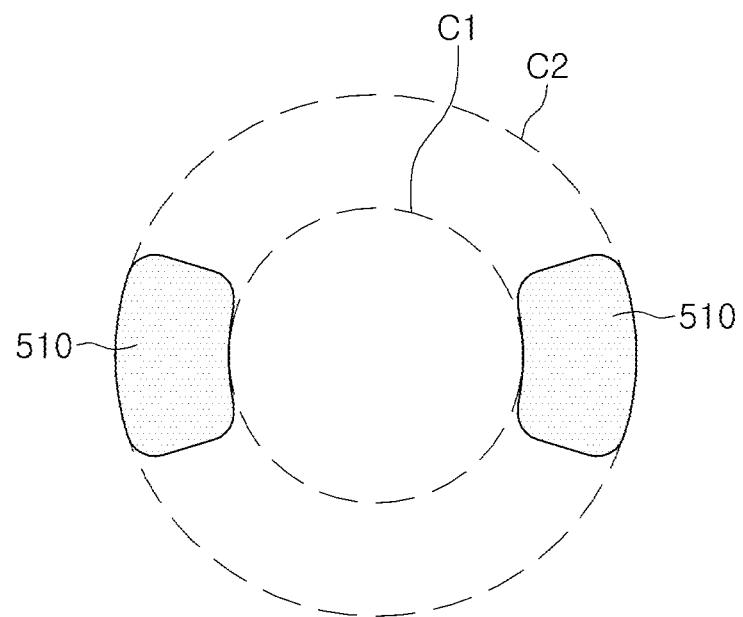
FIG. 7 is a front view of a first magnet.

FIG. 5 is a schematic explode perspective view of a lens module, a first frame, and a second frame, FIG. 6 is a perspective view of a first driving unit, and FIG. 7 is a front view of a first magnet.

Figure 8A:
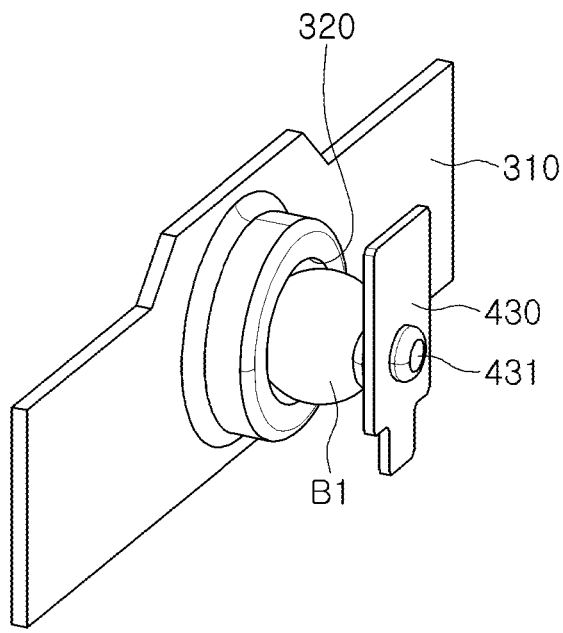
FIG. 8A is a schematic perspective view of a first guide unit provided between a first frame and a second frame.
Figure 8B:
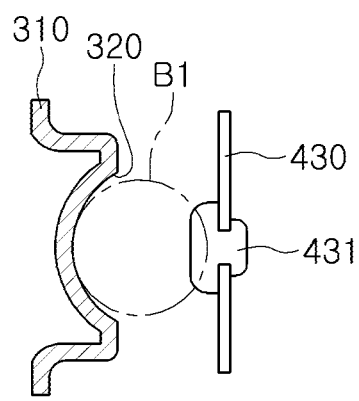
FIG. 8B is a lateral cross-sectional view of FIG. 8A.

FIG. 8A is a schematic perspective view of a first guide unit provided between a first frame and a second frame, and FIG. 8B is a lateral cross-sectional view of FIG. 8A.

Figure 9A:
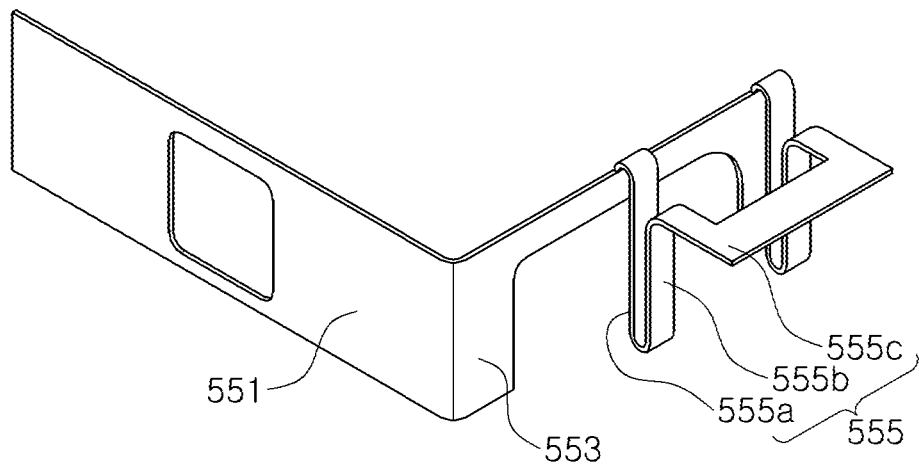
FIG. 9A is a perspective view of a first substrate.
Figure 9B:
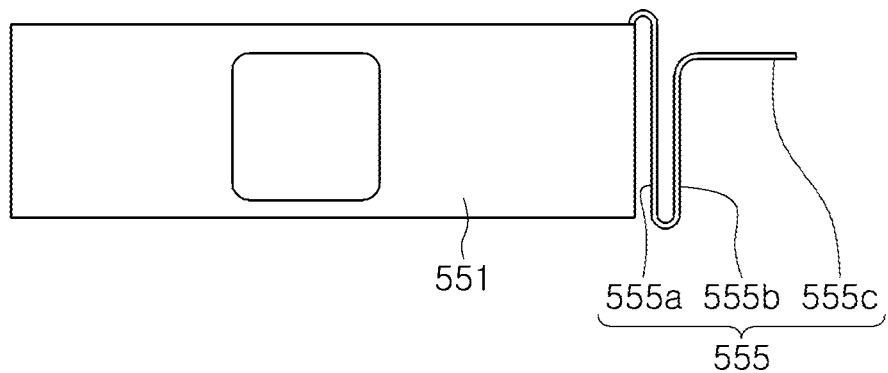
FIG. 9B is a side view of the first substrate.

FIG. 9A is a perspective view of a first substrate, and FIG. 9B is a side view of the first substrate.

Figure 10A:
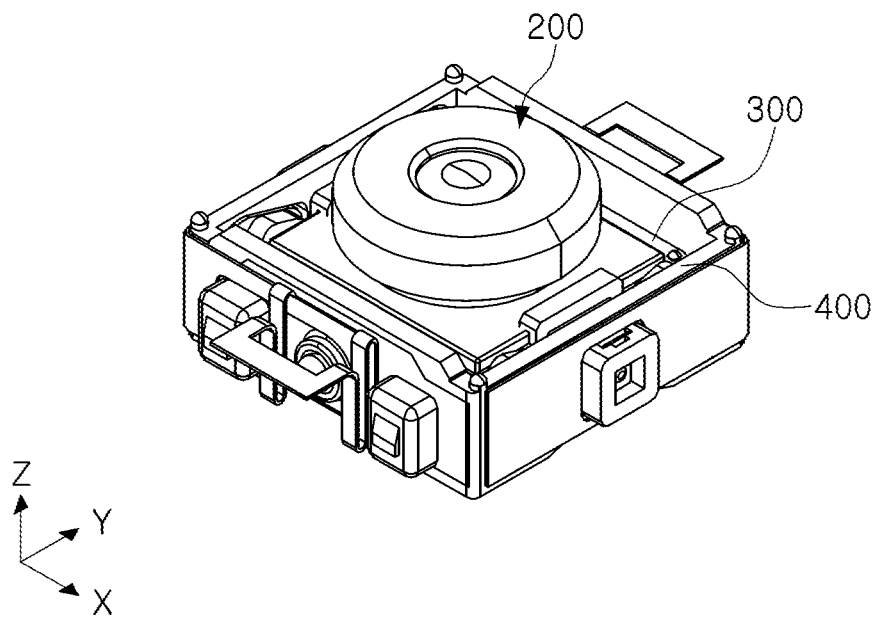
Figure 10B:
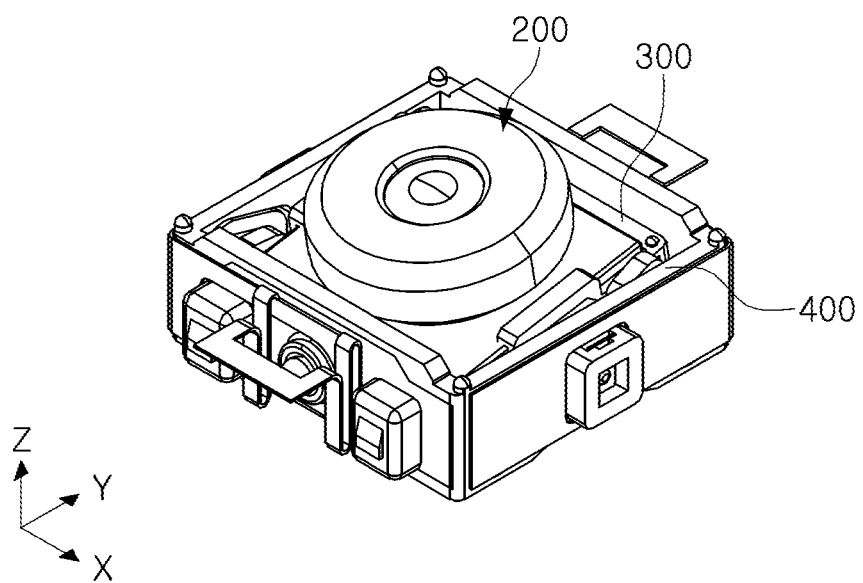
Figure 10C:
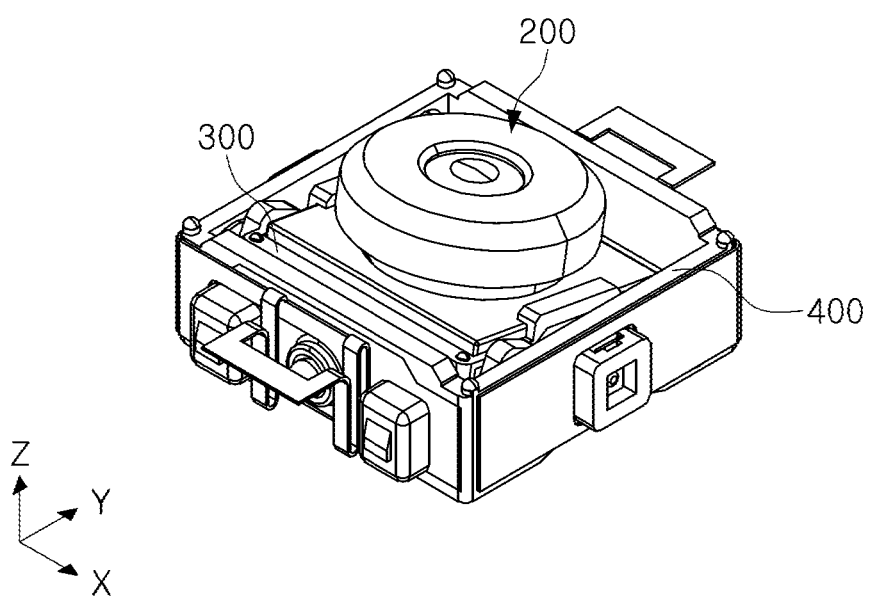

FIG. 10A to 10C are views illustrating that a lens module and a first frame rotate about a first axis.

A first frame 300 may be accommodated in a second frame 400, and may be provided to be relatively rotatable with respect to the second frame 400. For example, the first frame 300 may rotate about a first axis (the X-axis), perpendicular to an optical axis (a Z-axis).

Since a lens module 200 is accommodated in the first frame 300, the lens module 200 may rotate together with the first frame 300. In FIG. 5, the lens module 200 is illustrated as being coupled to a first frame 300.

A first guide unit may be provided between the first frame 300 and the second fame 400 to guide the rotation of the first frame 300 (see FIGS. 8A and 8B).

The first guide unit may include a first ball member B1, a first support member 310, and a first damper member 430. The first ball member B1 may be disposed between the first support member 310 and the first damper member 430.

The first support member 310 and the first damper member 430 may face each other in a first axis (X-axis) direction.

The first frame 300 may be provided with the first support member 310. As an example, the first support member 310 may be provided on a side surface of the first frame 300. The first support member 310 may be integrally coupled to the first frame 310 by insert injection. In this case, the first support member 310 may be manufactured to be integrated with the first frame 300 by injecting a resin material into a mold in the state in which the first support member 310 is fixed within the mold.

The first support member 310 may be formed by injection to be integrated with the first frame 300 such that a first accommodation groove 320 (to be described later) is exposed outwardly of the first frame 300.

The first frame 300 may be formed of a plastic material, and the first support member 310 may be formed of a metal material. Accordingly, rigidity of the first fame 300 may be improved by the first support member 310.

The first support member 310 may be provided with the first accommodation groove 320 for accommodating the first ball member B1. The first accommodation groove 320 may have a shape protruding from the first support member 310. Similar to the first support member 310, the first accommodation groove 320 may also be formed of a metal material.

The second frame 400 may be provided with a first through-hole 410 for accommodating the first ball member B1 (see FIG. 5). As an example, the first through-hole 410 may penetrate through a side surface of the second frame 400.

At least a portion of the first through-hole 410 may be blocked by the first damper member 430.

Accordingly, the first ball member B1 may be disposed between the first support member 310 and the first damper member 430.

An external side surface of the second frame 400 may be provided with a first protrusion portion 420, the first protrusion portion 420 may be provided with a first insertion groove 421 communicating with the first through-hole 410, and the first damper member 430 may be disposed in the first insertion groove 421.

The first damper member 430 may be provided with a buffer portion 431 having elastic force. As an example, the buffer portion 431 may be fitted and coupled to the first damper member 430 to protrude to one side and the other side of the first damper member 430.

The first ball member B1 may be elastically supported between the first accommodation groove 320, formed of a metal material, and the buffer portion 431 having elastic force.

The first ball member B1 may be elastically supported between the first frame 300 and the second frame 400 in the first axis (X-axis) direction. In addition, the first ball member B1 may be pressed between the first frame 300 and the second frame 400 in the first axis (X-axis) direction.

The first guide unit may be provided as a pair of first guide units disposed to be spaced apart from each other in the first axis (X-axis) direction.

Accordingly, the first frame 300 may rotate about the first axis (X-axis) direction, while being supported by the first guide portion.

A first driving unit 500 may provide driving force to the first frame 300. The first driving unit 500 may be disposed between the first frame 300 and the second frame 400. The first driving unit 500 may include a first magnet 510, a first coil 530, and a first substrate 550.

The first magnet 510 is provided on the first frame 300. As an example, the first magnet 510 may be provided on one side surface of the first frame 300.

Since the first support member 310 is provided on one side surface of the first frame 300 and the first support member 310 is formed of a metal material, the first magnet 510 may be brought into close contact with the first support member 310 by magnetic force. In addition, the first support member 310 may serve to focus magnetic force of the first magnet 510 to prevent generation of leakage magnetic flux.

The first magnet 510 may include one or two magnets disposed on one side of the first frame 300.

When the first magnet 510 includes one magnet, the first magnet 510 may be disposed to be offset from one side surface of the first frame 300. When the first magnet 510 includes two magnets, the two magnets may be disposed to be spaced apart from each other in a direction (for example, a second axis (Y-axis) direction), perpendicular to the optical axis (Z-axis) direction, based on a center of one side surface of the first frame 300.

As another example, the first magnet 510 may further include one or two magnets disposed on the other side surface of the first frame 300. In FIG. 5, two magnets are illustrated as being disposed on each of one side surface and the other side surface of the first frame 300.

The first coil 530 may be provided on the first substrate 500 to face the first magnet 510. The first coil 530 may be a copper clad pattern, stacked to be embedded in the first substrate 550, or a winding coil provide on the first substrate 550.

The first substrate 550 may be coupled to the second frame 400. The first substrate 550 may be electrically connected to a second substrate 650 coupled to the housing 100.

As illustrated in FIG. 5, when first coils 530 are respectively disposed on one side and the other side of the second frame 400, first substrates 500 may also be respectively coupled to one side surface and the other side surface of the second frame 400. In this case, the first substrates 550 may be separated from each other, but may be formed to be integrated with each other.

Since the second frame 400 is configured to rotate about the second axis (the Y-axis) and the first substrate 550 is coupled to the second frame 400, the first substrate 550 may also rotate about the second axis (the Y-axis) together with the second frame 400.

Referring to FIGS. 9A and 9B, the first substrate 550 may include a connection portion 555 to be electrically connected to an external substrate. The external substrate may refer to a second substrate 650 coupled to the housing 100.

For example, the first substrate 550 may include a first side 551 and a second side 553, and the second side 553 of the first substrate 550 may include a connection portion 555 connected to the second substrate 650 coupled to the housing 100, a fixed member. The connection portion 555 may extend from the first substrate 550 and may have a shape repeatedly bent in the optical axis (Z-axis) direction. As an example, the connection portion 555 may have a U-shaped bent structure or a n-shaped bent portion.

The connection portion 555 may have a shape of a flexible film, on which a conductive material is patterned, or a shape in which a plurality of cables is extended.

Accordingly, when the first substrate 550 rotates about the second axis (the X-axis) together with the second frame 400, the connection portion 555 may be bent.

The connection portion 555 may include a first connection portion 555a bent to extend from the first substrate 550 in the optical axis (the Z-axis), a second connection portion 555b bent to extend from the first connection portion 555a in the optical axis (the Z-axis), and a third connection portion 555c extending from the second connection portion 555b to be connected to the second substrate 650. Directions, in which the first connection portion 555a and the second connection portion 555b extend, may be opposite to each other.

The first coil 530 may include a number of coils, corresponding to the number of the first magnets 510.

The first magnet 510 and the first coil 530 may be disposed to face each other in a direction, perpendicular to the optical axis (the Z-axis). For example, the first magnet 510 and the first coil 530 may be disposed to face each other in the first direction (the X-axis direction).

A surface of the first magnet 510, facing the first coil 530, may be provided with a first pole and a second pole magnetized in the optical axis (Z-axis) direction. The surface of the first magnet 510, facing the first coil 530, may be provided with a first pole, a neutral zone, and a second pole. The first pole may be an N-pole or an S-pole, and the second pole may be opposite to the first pole (an S-pole or an N-pole). The neutral zone may be provided between the first pole and the second pole.

The first magnet 510 and the first coil 530 may generate driving force in a direction, perpendicular to a direction in which they face each other. For example, the first magnet 510 and the first coil 530 may generate driving force in the optical axis (Z-axis) direction.

Accordingly, the driving force of the first magnet 510 and the first coil 530 may allow the first frame 300 to rotate about the first axis (the X-axis).

Since the lens module 200 is accommodated in the first frame 300, the lens module 200 may also rotate together with the first frame 300 as the first frame 300 rotates.

The lens module 200 may be provided with an image sensor module 250. The image sensor module 250 may also rotate together with the lens module 200.

The image sensor module 250 may be connected to the connection substrate portion 700. The connection substrate portion 700 may be flexibly configured to support the rotation of the image sensor module 250. The configuration of the connection substrate portion 700 will be described later with reference to FIGS. 17 to 19.

When the first frame 300 rotates about the first axis (the X-axis), the first magnet 510 may be a movable member, rotating together with the first frame 300, and the first coil 530 may be a fixed member.

The first magnet 510 may have a rounded shape (see FIG. 7). As an example, the first magnet 510 may have a circular arc shape.

An internal side surface (a surface facing a rotation center point or a surface facing the first axis (the X-axis)) and an external side surface (a surface opposing the internal side surface) of the first magnet 510 may each have a rounded shape.

An inscribed circle C1, in contact with the internal side surface of the first magnet 510, and a circumscribed circle C2, in contact with the external side surface of the first magnet 510, may be concentric circles.

When the first magnet 510 includes two magnets disposed on one side surface of the first frame 300, the inscribed circle C1, in contact with an internal side surface of each of the two magnets, and the circumscribed circle C2, in contact with an internal side surface of each of the two magnets, may be concentric circles.

The first substrate 550 may be provided with a first position measurement unit 531. As an example, the first position measurement unit 531 may be disposed in a hollow portion of the first coil 530 to face the first magnet 510. The first position measurement unit 531 may be provided with at least one first position measurement unit 531.

When the first magnet 510 includes one or two magnets disposed on one side surface of the first frame 300, a single first position measurement unit 531 may be provided. For example, the first position measurement unit 531 may be disposed to face a certain magnet.

When two magnets are disposed on each of the one side surface and the other side surface of the first frame 300, two first position measurement units 531 may be provided. For example, one of the two first position measurement units 531 may be disposed to face one of the two magnets disposed on the one side surface of the first frame 300, and the other first position measurement unit 531 may be disposed to face one of the two magnets disposed on the other side surface of the first frame 300. In this case, the two first position measurement units 531 may be disposed to face each other in a diagonal direction.

Even when two magnets are disposed on each of the one side surface and the other side surface of the first frame 300, a single first position measurement unit 531 may be provided. In this case, the first position measurement unit 531 may be disposed to face one of the four magnets.

The first position measurement unit 531 may detect a position of the first frame 300 when the first frame 300 rotates about the first axis (the X-axis).

The first position measurement unit 531 may be a Hall sensor.

A stopper may be provided on an upper surface of the first frame 300. The stopper may include an elastic material. The stopper may serve to buffer impact and noise when the first frame 300 collides with the case 140.

Figure 11A:
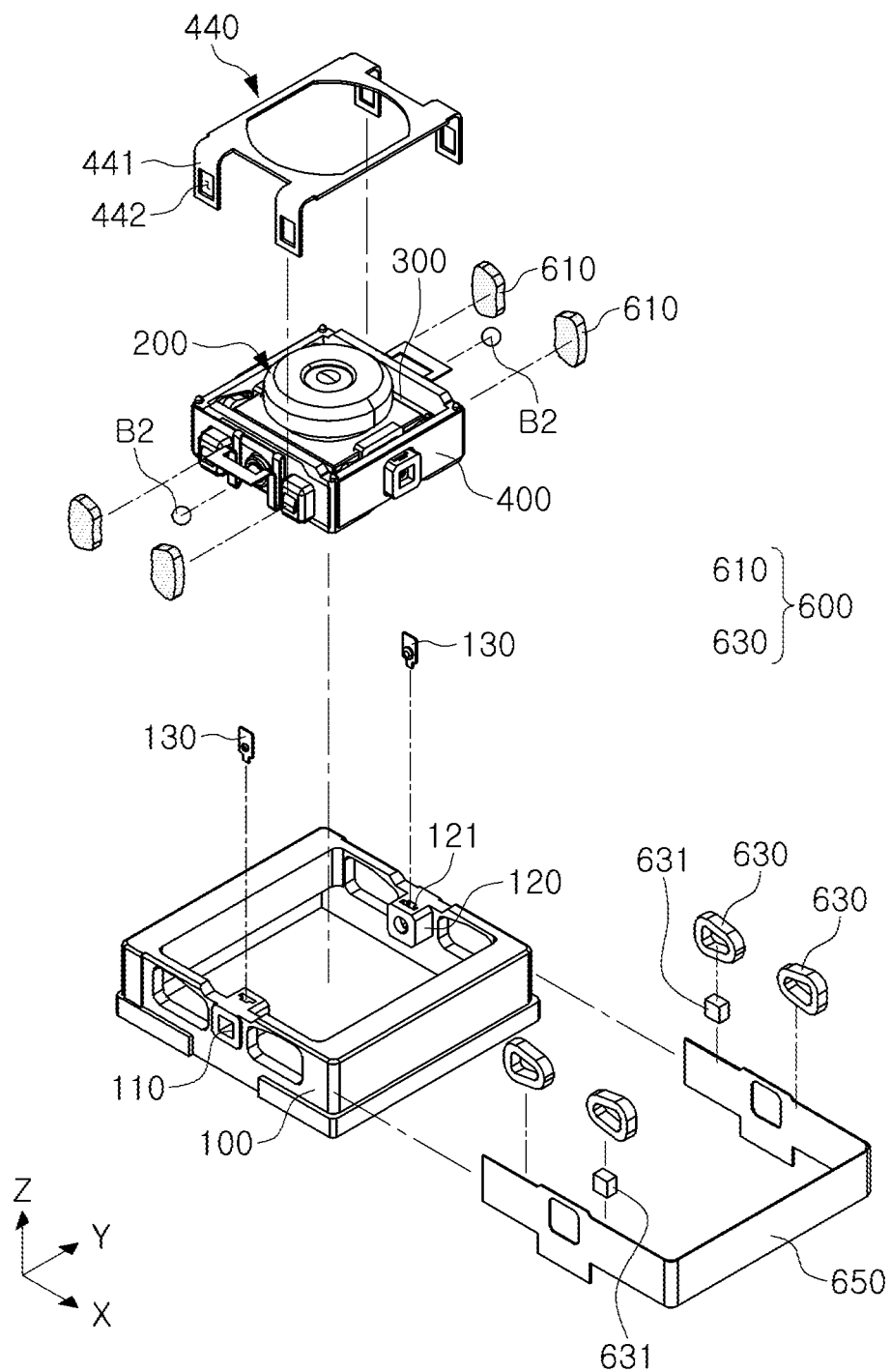
FIGS. 11A and 11B are schematic exploded perspective views of a second frame and a housing.
Figure 11B:
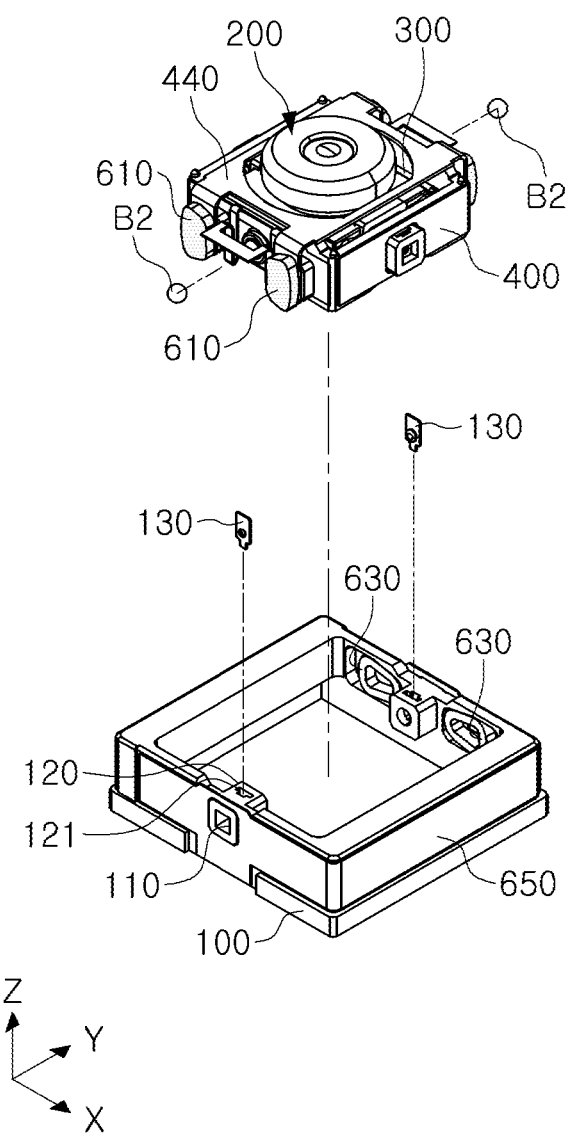

FIGS. 11A and 11B are schematic exploded perspective views of a second frame and a housing.

Figure 12A:
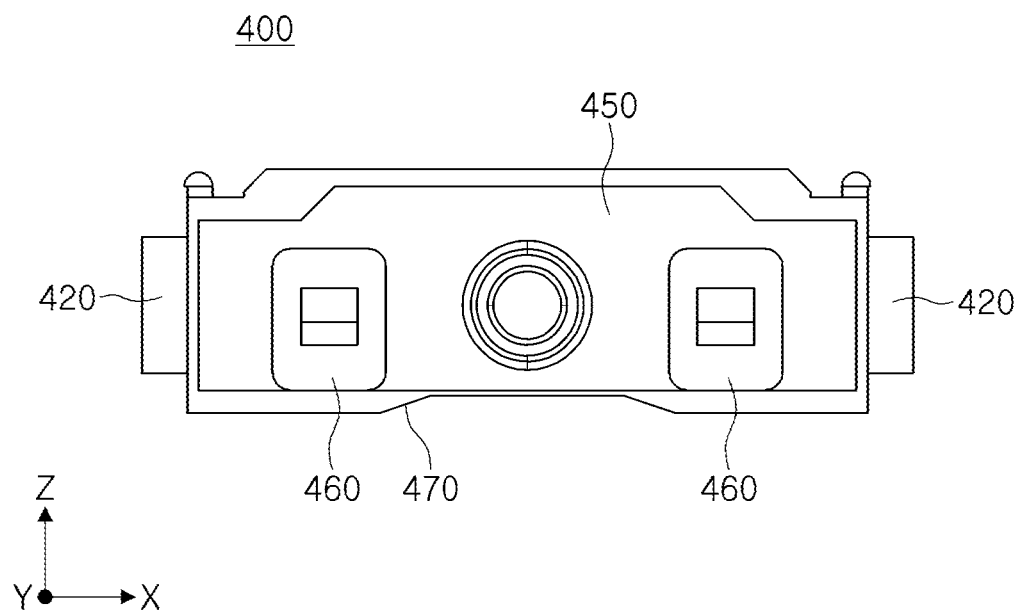
FIG. 12A is one side view of a second frame.
Figure 12B:
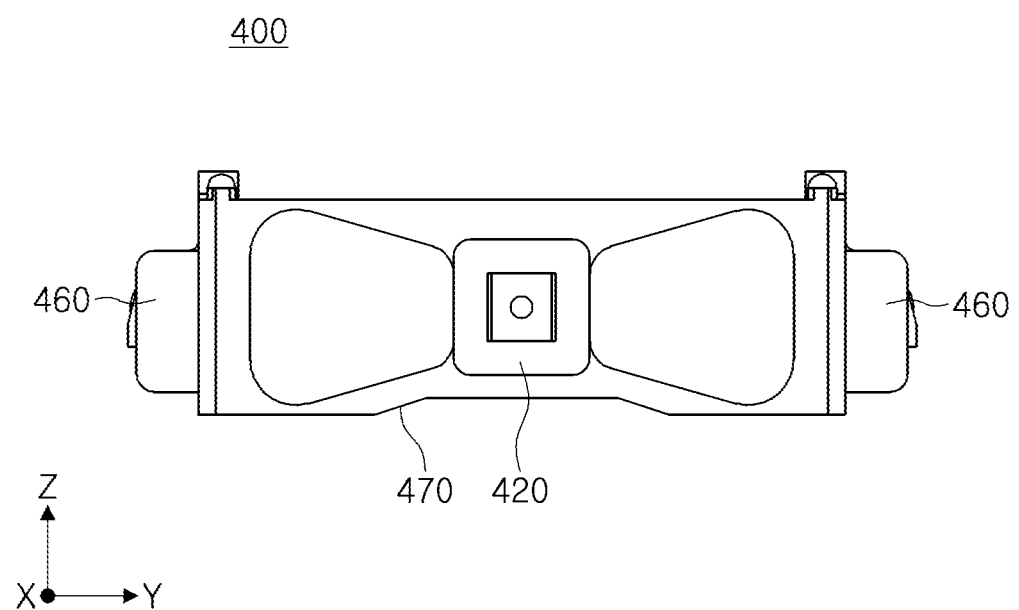
FIG. 12B is the other side view of the second frame.

FIG. 12A is one side view of a second frame, and FIG. 12B is the other side view of the second frame.

Figure 13:
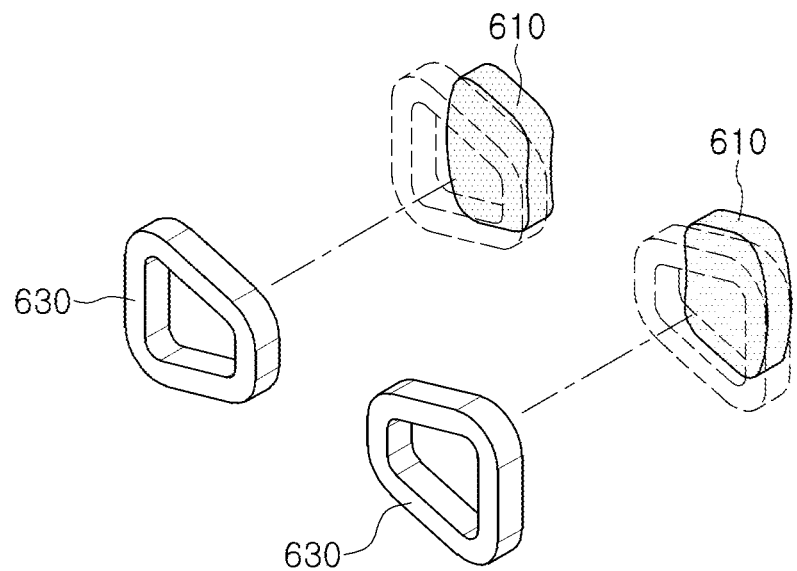
FIG. 13 is a perspective view of a second driving unit.
Figure 14:
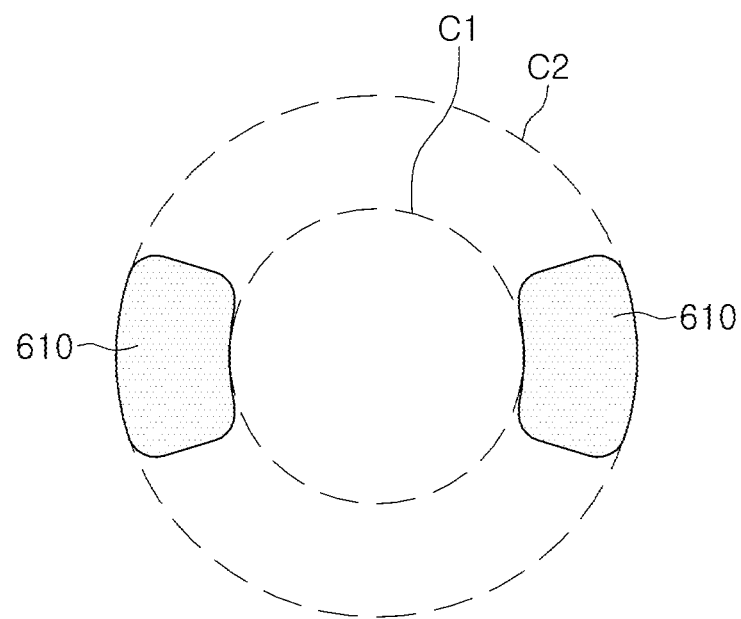
FIG. 14 is a front view of a second magnet.

FIG. 13 is a perspective view of a second driving unit, and FIG. 14 is a front view of a second magnet.

Figure 15A:
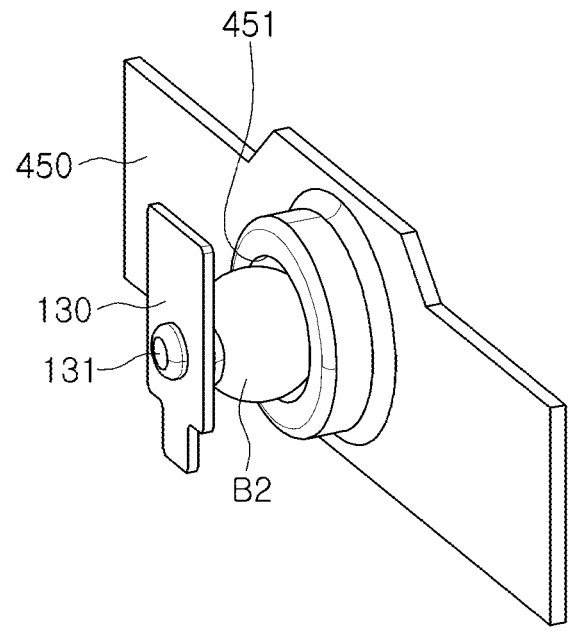
FIG. 15A is a schematic perspective view of a second guide unit provided between a second frame and a housing.
Figure 15B:
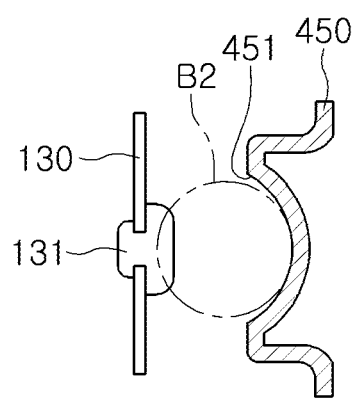
FIG. 15B is a lateral cross-sectional view of FIG. 15A.

FIG. 15A is a schematic perspective view of a second guide unit provided between a second frame and a housing, and FIG. 15B is a lateral cross-sectional view of FIG. 15A.

Figure 16A:
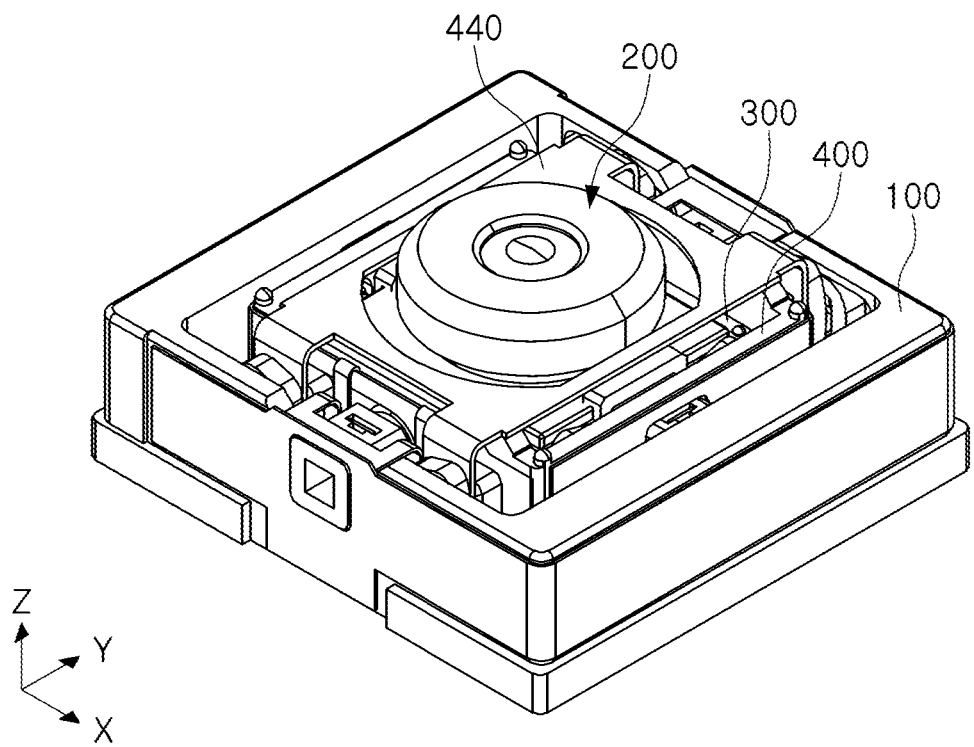
FIGS. 16A, 16B, and 16C are views illustrating how a second frame rotates about a second axis.
Figure 16B:
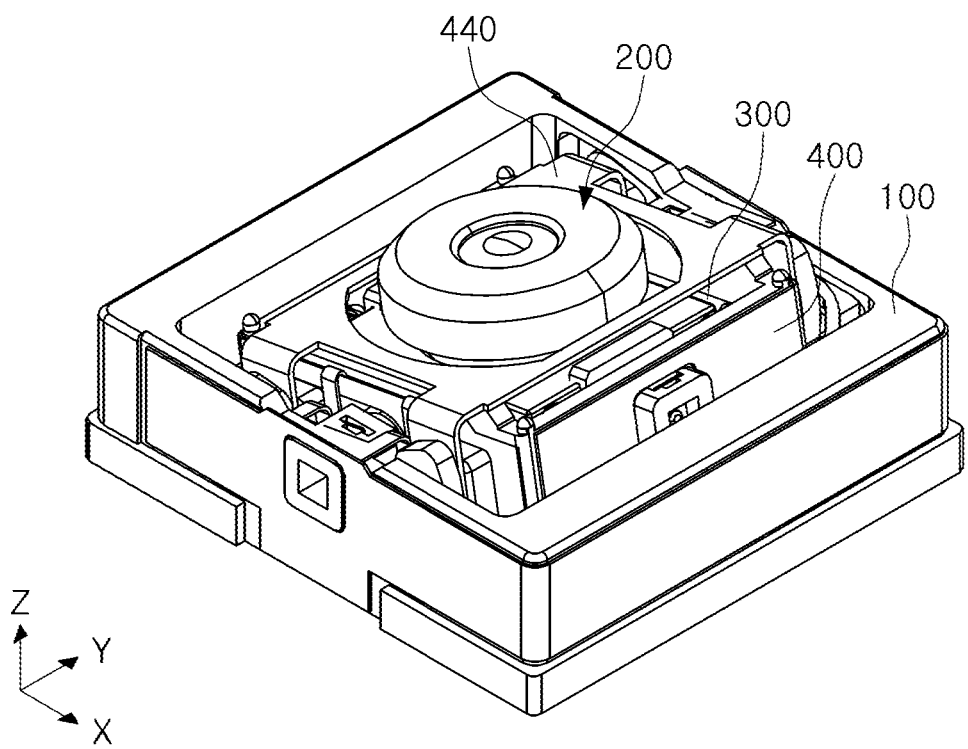
Figure 16C:
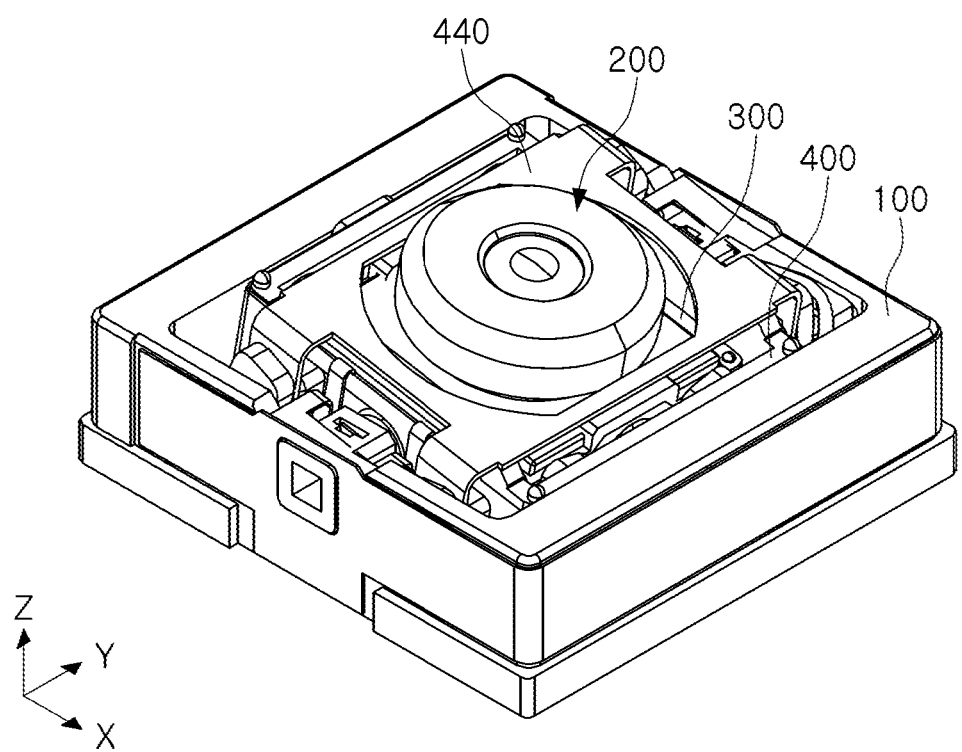

FIGS. 16A to 16C are views illustrating a second frame rotates about a second axis.

A second frame 400 may be accommodated in a housing 100, and may be provided to be relatively rotatable with respect to the housing 100. For example, the second frame 400 may rotate about a second axis (a Y-axis), perpendicular to both an optical axis (a Z-axis) and a first axis (an X-axis).

A second guide unit may be provided between the second frame 400 and the housing 100 to guide the rotation of the second frame 400 (see FIGS. 15A and 15B).

The second guide unit may include a second ball member B2, a second support member 450, and a second damper member 130. The second guide unit may have a shape substantially similar to the shape of the first guide unit.

The second ball member B2 may be disposed between the second support member 450 and the second damper member 130. The second support member 450 and the second damper member 130 may face each other in the second axis (Y-axis) direction.

The second frame 400 may be provided with the second support member 450. As an example, the second support member 450 may be provided on a side surface of the second frame 400. The second support member 450 may be integrally coupled to the second frame 400 by insert injection. In this case, the second support member 450 may be manufactured to be integrated with the second frame 400 by injecting a resin material into a mold in the state in which the second support member 450 is fixed within the mold.

The second support substrate 450 may be formed by injection to be integrated such the second frame 400 such that a second accommodation groove 451 (to be described later) is exposed outwardly of the second frame 400.

The second frame 400 may be formed of a plastic material, and the second support member 450 may be a metal material. Accordingly, rigidity of the second frame 400 may be improved by the second support member 450.

The second support member 450 may be provided with a second accommodation groove 451 for accommodating the second ball member B2. The second accommodation groove 451 may have a shape protruding from the second support member 450. Similar to the second support member 450, the second accommodation groove 451 may also be formed of a metal material.

The housing 100 may be provided with a second through-hole 110. As an example, the second through-hole 110 may penetrate through a side surface of the housing 100.

At least a portion of the second through-hole 110 may be blocked by the second damper member 130 provided in the housing 100.

Accordingly, the second ball member B2 may be disposed between the second support member 450 and the second damper member 130.

An internal side surface of the housing 100 may be provided with a second protrusion portion 120. The second protrusion portion 120 may be provided with a second insertion groove 121 communicating with the second through-hole 110. The second damper member 130 may be disposed in the second insertion groove 121.

The second damper member 130 may be provided with a buffer portion 131 having elastic force. As an example, the buffer portion 131 may be fitted and coupled to the second damper member 130 to protrude to one side and the other side of the second damper member 130.

The second ball member B2 may be elastically support between the second accommodation groove 451, formed of a metal material, and the buffer portion 131.

The second ball member B2 may be elastically supported between the second frame 400 and the housing 100 in the second axis (Y-axis) direction. In addition, the second ball member B2 may be pressed between the second frame 400 and the housing 100 in the second axis (Y-axis) direction.

The second guide unit may be provided as a pair of second guide units disposed to be spaced apart from each other in the second axis (Y-axis) direction.

Accordingly, the second frame 400 may rotate about the second axis (Y-axis) direction, while being supported by the second guide portion.

Even when the first ball member B1 is elastically supported between the first support member 310 and the first damper member 430 and the second ball member B2 is elastically supported between the second support member 450 and the second damper member 130, the first ball member B1 and/or the second ball member B2 may be separated by unexpected impact, or the like, applied during use of the camera module 2.

Accordingly, a cover 440 may be coupled to the second frame 400 to prevent the separation of the first ball member B1 and/or the second ball member B2. The cover 440 may be coupled to the second frame 400 to cover a portion of open tops of the first frame 300 and the second frame 400.

The cover 440 may be provided with a coupling portion 441 extending in the optical axis (Z-axis) direction (see FIG. 11A). The coupling portion 441 may be provided with a coupling groove 442, and the second frame 400 may be provided with a coupling projection 460 (see FIGS. 12A and 12B). Accordingly, the coupling groove 442 may be fitted into the coupling projection 460 to couple the cover 440 to the second frame 400. The cover 440 may be formed of a metal material.

A second driving unit 600 may provide driving force to the second frame 400. The second driving unit 600 may be disposed between the first frame 300 and the second frame 400. The second driving unit 600 may include a second magnet 610, a second coil 630, and a second substrate 650.

The second magnet 610 may be provided on the second frame 400. As an example, the second magnet 610 may be provided on one side of the second frame 400.

The cover 440 may be coupled to the second frame 440, and the second magnet 610 may be disposed in the coupling portion 441 of the cover 440 (see FIG. 11B). Since the cover 440 is formed of a metal material, the second magnet 610 may be brought into close contact with the coupling portion 441 of the cover 440 by magnetic force. In addition, the cover 440 may serve to focus the magnetic force of the second magnet 610 to prevent generation of leakage magnetic flux.

The second magnet 610 may include one or two magnets disposed on one side of the second frame 400.

When the second magnet 610 includes one magnet, the second magnet 610 may be disposed to be offset from one side surface of the second frame 400. When the second magnet 610 includes two magnets, the two magnets may be disposed to be spaced apart from each other in a direction (for example, a second axis (X-axis) direction, perpendicular to the optical axis (Z-axis) direction, based on a center of one side surface of the second frame 400.

As another example, the second magnet 610 may further include one or two magnets disposed on the other side surface of the second frame 400. In FIGS. 11A and 11B, two magnets are illustrated as being disposed on each of one side surface and the other side surface of the second frame 400.

The second coil 630 may be provided on the second substrate 650 to face the second magnet 610. The second coil 630 may be a copper clad pattern, stacked to be embedded in the second substrate 650, or a winding coil provide on the second substrate 650.

The second substrate 650 may be coupled to the housing 100. The second substrate 650 may be electrically connected to the connection substrate portion 700.

The second coil 630 may include a number of coils, corresponding to the number of the second magnets 610.

The second magnet 610 and the second coil 630 may be disposed to face each other in a direction, perpendicular to the optical axis (the Z-axis). For example, the second magnet 610 and the second coil 630 may be disposed to face each other in the second direction (the Y-axis).

A surface of the second magnet 610, facing the second coil 630, may be provided with a second pole and a second pole magnetized in the optical axis (Z-axis) direction. The surface of the second magnet 610, facing the second coil 630, may be provided with a second pole, a neutral zone, and a second pole. The first pole may be an N-pole or an S-pole, and the second pole may be opposite to the second pole (an S-pole or an N-pole). The neutral zone may be provided between the second pole and the second pole.

The second magnet 610 and the second coil 630 may generate driving force in a direction, perpendicular to a direction in which they face each other. For example, the second magnet 610 and the second coil 630 may generate driving force in the optical axis (Z-axis) direction.

Accordingly, the driving force of the second magnet 610 and the second coil 630 may allow the second frame 400 to rotate about the second axis (the Y-axis).

Since the lens module 200 and the first frame 300 are accommodated in the second frame 400, the lens module 200 and the first frame 300 may also rotate together with the second frame 400 as the second frame 400 rotates.

When the second frame 400 rotates about the second axis (the Y-axis), the second magnet 610 is movable member rotating together with the second frame 400, while the second coil 630 is a fixed member.

The second magnet 610 may have a rounded shape. As an example, the second magnet 610 may include a circular arc shape.

An internal side surface (a surface facing a rotation center point or a surface facing the first axis (the X-axis)) and an external side surface (a surface opposing the internal side surface) of the second magnet 610 may each have a rounded shape.

An inscribed circle C1, in contact with the internal side surface of the second magnet 610, and a circumscribed circle C2, in contact with the external side surface of the second magnet 610, may be concentric circles.

When the second magnet 610 includes two magnets disposed on one side surface of the second frame 400, the inscribed circle C1, in contact with an internal side surface of each of the two magnets, and the circumscribed circle C2, in contact with an internal side surface of each of the two magnets, may be concentric circles.

The second substrate 650 may be provided with a second position measurement unit 631. As an example, the second position measurement unit 631 may be disposed in a hollow portion of the second coil 630 to face the second magnet 610. The second position measurement unit 631 may be provided with at least one second position measurement unit 631.

When the second magnet 610 includes one or two magnets disposed on one side surface of the second frame 400, a single second position measurement unit 631 may be provided. For example, the second position measurement unit 631 may be disposed to face a certain magnet.

When two magnets are disposed on each of the one side surface and the other side surface of the second frame 400, two second position measurement units 631 may be provided. For example, one of the two second position measurement units 631 may be disposed to face one of the two magnets disposed on the one side surface of the second frame 400, and the other second position measurement unit 631 may be disposed to face one of the two magnets disposed on the other side surface of the second frame 400. In this case, the two second position measurement units 631 may be disposed to face each other in a diagonal direction.

Even when two magnets are disposed on each of the one side surface and the other side surface of the second frame 400, a single second position measurement unit 631 may be provided. In this case, the second position measurement unit 631 may be disposed to face one of the four magnets.

The second position measurement unit 631 may detect a position of the second frame 400 when the second frame 400 rotates about the second axis (the Y-axis).

The second position measurement unit 631 may be a Hall sensor.

The camera module 2 according to an example may be configured such that a relative position between the second magnet 610 and the second coil 630 (for example, a facing distance therebetween or a spaced distance therebetween in the second axis (Y-axis) direction) is not changed even when the first frame 300 rotates about the first axis (the X-axis) due to the first driving unit 500.

In addition, in the camera module 2 according to an example, a relative position between the first magnet 510 and the first coil 530 (for example, a facing distance therebetween or a spaced distance therebetween in the first axis (X-axis) direction) is not changed even when the second frame 400 rotates about the second axis (the Y-axis) due to the second driving unit 600.

As a result, a motion of rotation about each axis may be precisely controlled.

Referring to FIGS. 12A and 12B, a lower end portion of the second frame 400 may be provided with an escape portion 470. The escape portion 470 may have a shape of a hole formed in a lower surface of the second frame 400.

A total of four escape portions 470 may be provided on four lower end portions of four side surfaces of the second frame 400, respectively.

When the second frame 400 rotates about the second axis (the Y-axis), the escape portion 470 may serve to prevent the connection substrate portion 700 and the second frame 400 from interfering with each other.

A stopper may be provided on the upper surface of the second frame 400. The stopper may be formed of an elastic material. The stopper may serve to buffer impact and noise when the second frame 400 collides with the case 140.

Figure 17:
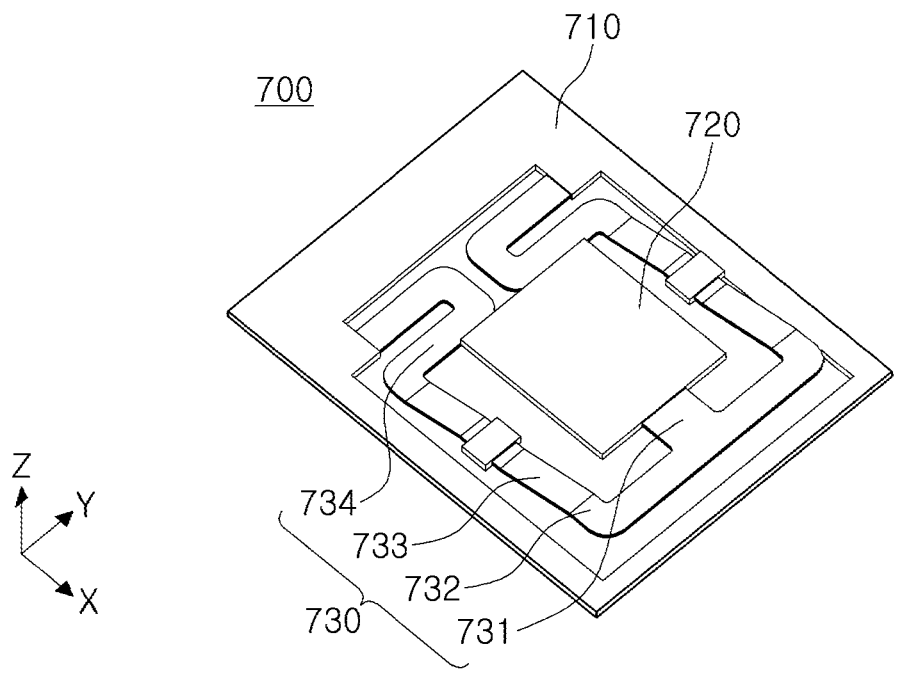
FIG. 17 is a perspective view of a connection substrate portion.
Figure 18:
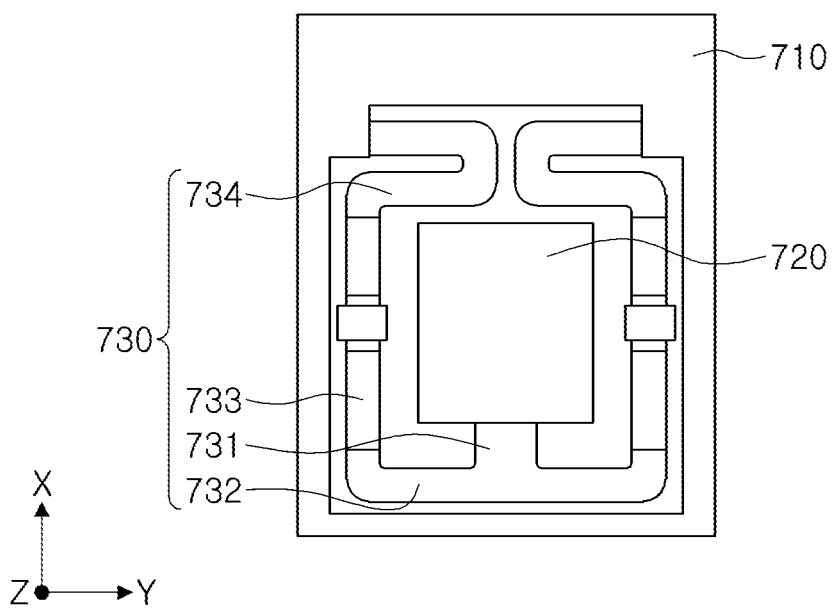
FIG. 18 is a plan view of the connection substrate portion.
Figure 19:
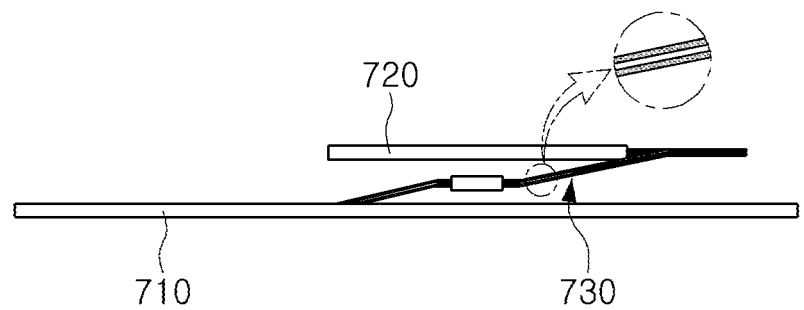
FIG. 19 is a side view of the connection substrate portion.
Figure 20:
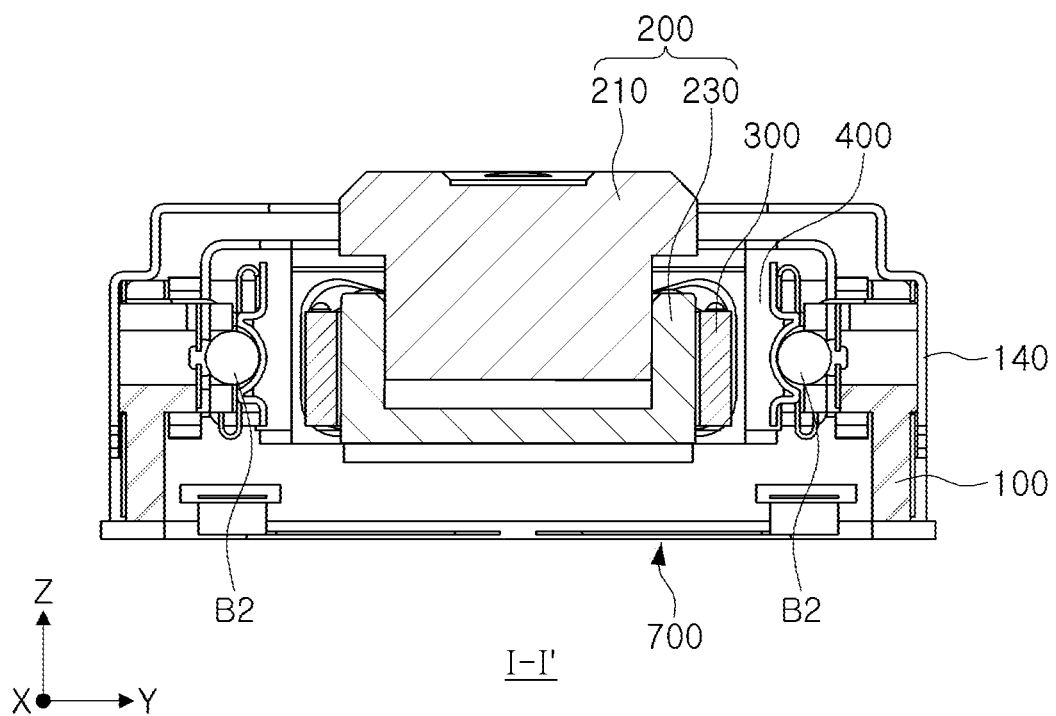
FIG. 20 is a cross-sectional view taken along line I-I' of FIG. 3.
Figure 21:
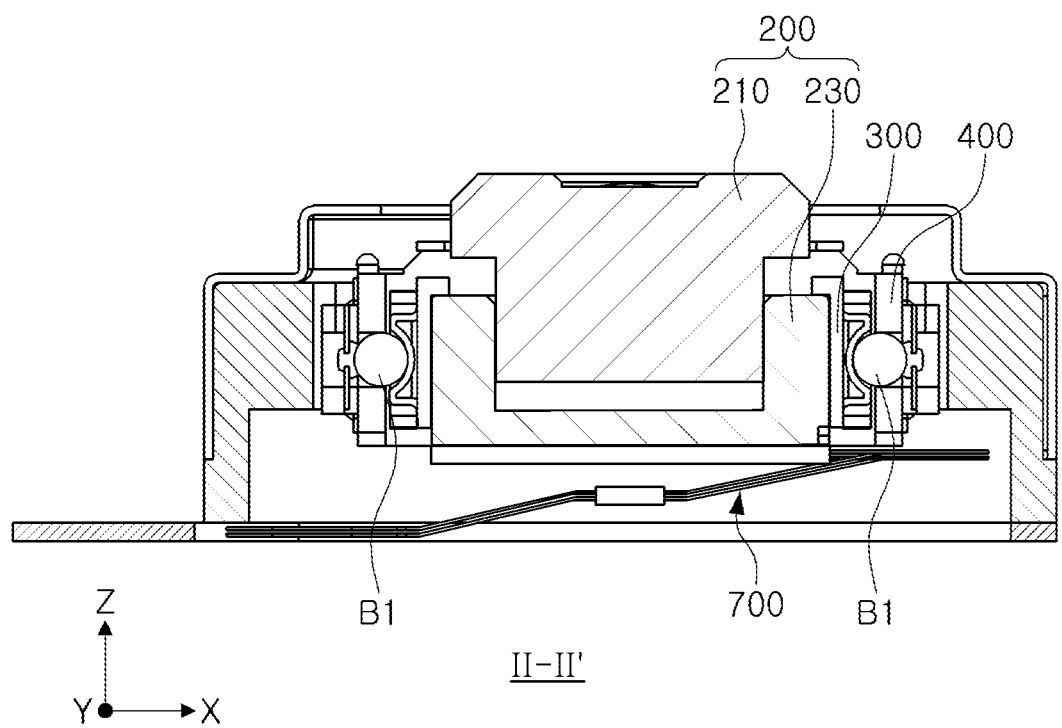
FIG. 21 is a cross-sectional view take along line Ill l' of FIG. 3.

FIG. 17 is a perspective view of a connection substrate portion, FIG. 18 is a plan view of the connection substrate portion, and FIG. 19 is a side view of the connection substrate portion.

A connection substrate portion 700, illustrated in FIGS. 17 to 19, may have one side connected to a housing 100 and the other side connected to a lens module 200.

At least a portion of the connection substrate portion 700 may be flexibly formed to support a rotation of the lens module 200.

An image sensor module 250, provided below the lens module 200, may be connected to the connection substrate portion 700. Alternatively, the image sensor module 250 may be directly disposed on the connection substrate portion 700, and the connection substrate portion 700 may be coupled to a holder 250 of the lens module 200.

In the connection substrate portion 700, a portion connected to the lens module 200 is a movable member rotating together with the lens module 200, and a portion connected to the housing 100 is a fixed member.

The connection substrate portion 700 may include a first base substrate 710, a second base substrate 720, and a connection substrate 730.

The first base substrate 710 may be coupled to the housing 100. A through-hole is provided in a central portion of the first base substrate 710. The through-hole may serve to prevent the second base substrate 720 and the connection substrate 730 from interfering with the first base substrate 710 when the lens module 200 rotates.

Although not illustrated in the drawings, the first base substrate 710 may be provided with a connector connected to an external terminal.

The second base substrate 720 may be coupled to the lens module 200. As an example, the second base substrate 720 may be coupled to the image sensor module 250 provided in the lens module 200. Alternatively, the image sensor 251 may be provided on the second base substrate 720, and the second base substrate 720 may be coupled to the holder 230 of the lens module 200.

The second base substrate 720 may rotate about a first axis (an X axis) and a second axis (a Y-axis) together with the lens module 200.

In a state in which the first base substrate 710 is coupled to the housing 100 and the second base substrate 720 is coupled to the lens module 200, the second base substrate 720 may be disposed to be higher than the first base substrate 710 in an optical axis (Z-axis) direction. The connection substrate 730 may have an inclined shape.

The connection substrate 730 may be a flexible circuit board, and may connect the first base substrate 710, a fixed member, and the second base substrate 720, a rotatable member, to each other.

When viewed in the optical axis (Z-axis) direction, the connection substrate 730 may be provided to surround at least three side surfaces of the second base substrate 720.

For example, the connection substrate 730 may include a first extension portion 731, a branch portion 732, a second extension portion 733, and a bent portion 734.

The first extension portion 731 may extend from the second base substrate 720. As an example, the first extension portion 731 may extend from one side surface of the second base substrate 720 in a first axis (X-axis) direction.

The branch portion 732 may extend from the first extension portion 731 and may extend to both sides of the first extension portion 731. As an example, the branch portion 732 may extend from the first extension portion 731 to both sides in a second axis (Y-axis) direction.

The second extension portion 733 may extend from the branch portion 732. As an example, the second extension portion 733 may extend from the branch portion 732 in the first axis (X-axis) direction.

The bent portion 734 may extend from the second extension portion 733. As an example, the bent portion 734 may extend from the second extension portion 733 in the second axis (Y-axis) direction and may have a bent shape. As an example, the bent portion 734 may have a U-shaped bent structure or a n-shaped bent structure.

The connection substrate 730 may have a shape of a flexible film, on which a conductive material is patterned, or a shape in which a plurality of cables is extended. Therefore, the connection substrate 730 may be bent when the second base substrate 720 rotates.

The connection substrate 730 may include a plurality of layers spaced apart from each other in the optical axis (Z-axis) direction. Thus, the connection substrate 730 may be more flexibly formed by decreasing a width thereof.

The camera module according to an example may include a connection substrate portion 9000, to be described later with reference to FIGS. 34 and 35, instead of the connection substrate portion 700 described with reference to FIGS. 17 to 19.

Figure 22:
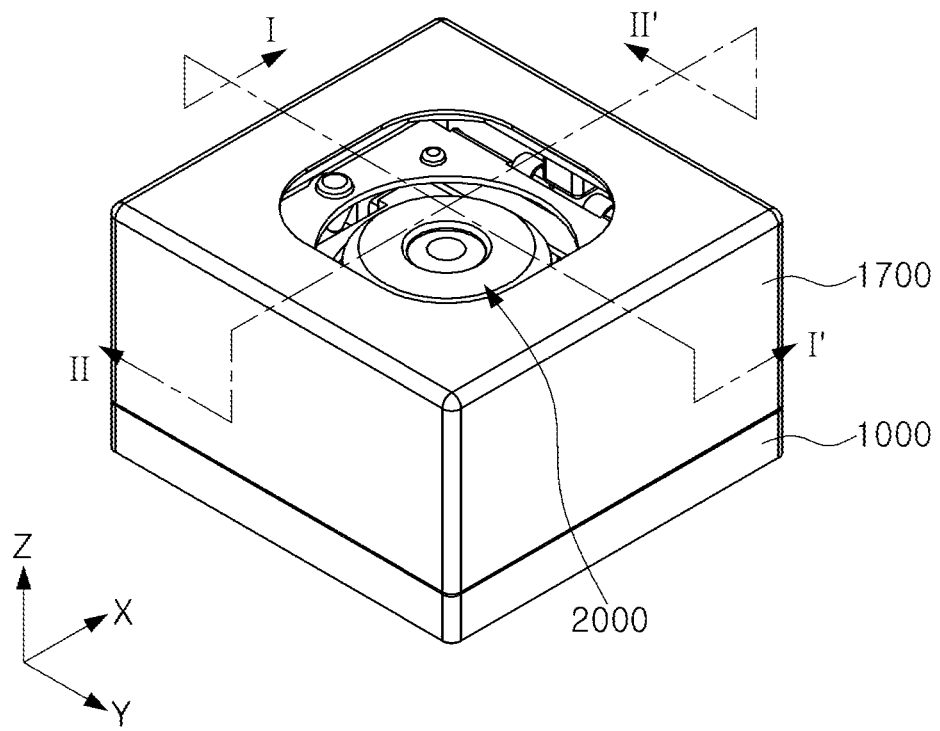
FIG. 22 is a perspective view of a camera module according to another example.
Figure 23:
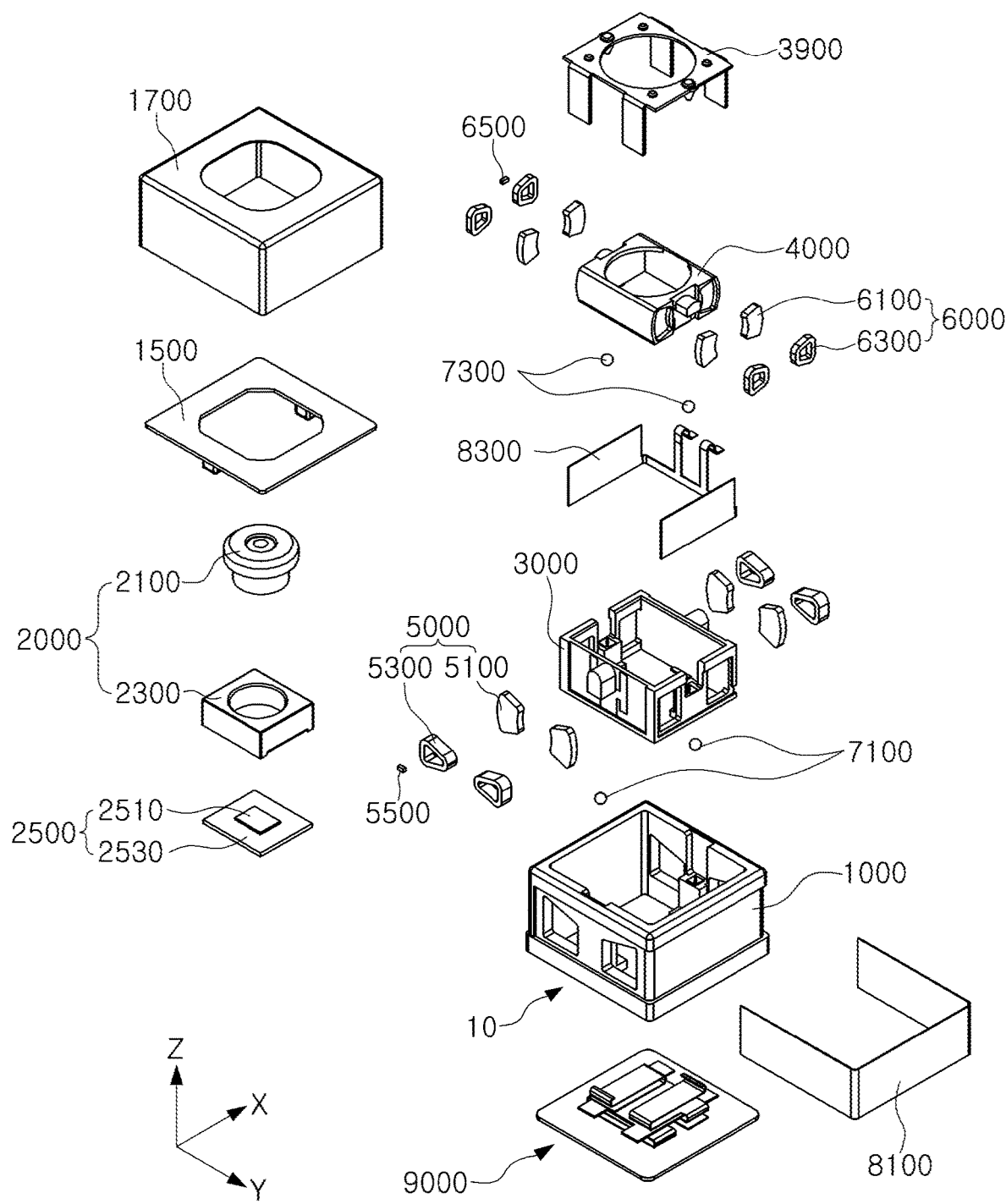
FIG. 23 is an exploded perspective view of a camera module according to another example.

FIG. 22 is a perspective view of a camera module according to another example, and FIG. 23 is an exploded perspective view of a camera module according to another example.

Referring to FIGS. 22 and 23, a camera module 2 according to another example may include a lens module 2000, a first frame 3000, a second frame 4000, a housing 1000, and a case 1700.

The lens module 2000 may be accommodated in the second frame 4000, the second frame 4000 may be accommodated in the first frame 3000, and the first frame 3000 may be accommodated in the housing 1000.

The housing 1000 and the case 1700 may be a fixed body 10. The first frame 3000 may be a first movable body 30 rotating about a first axis (an X-axis).

In addition, the lens module 2000 and the second frame 4000 may be a second movable body 50 rotating about a second axis (a Y-axis). The second movable body 50 may be accommodated in the first movable body 30 and may rotate about the first axis (the X-axis) together with the first movable body 30.

The lens module 2000 may include a lens unit 2100 and a holder 2300. The lens unit 2100 may refer to a lens barrel, but is not limited thereto. For example, the lens unit 2100 may refer to a form in which a lens barrel and a carrier are coupled to each other.

At least one lens for imaging a subject may be accommodated in the lens unit 2100. When a plurality of lenses is disposed, the lenses may be mounted inside the lens unit 2100 in an optical axis (a Z-axis).

The lens unit 2100 may be accommodated in the holder 2300. As an example, the holder 2300 may have a shape with open top and bottom, and the lens unit 2100 may be accommodated in an internal space of the holder 2300.

The lens module 2000 may further include an image sensor module 2500 disposed below the holder 2300.

The image sensor module 2500 may be a device configured to converts light, incident through the lens unit 2100, into an electric signal.

As an example, the image sensor module 2500 may include an image sensor 2510 and a printed circuit board 2530 connected to the image sensor 2510, and may further include an infrared filter.

The infrared filter may serve to block light in an infrared region in the light incident through the lens unit 2100.

The image sensor 2510 may convert the light, incident through the lens unit 2100, into an electrical signal. As an example, the image sensor 2510 may be a charge-coupled device (CCD) or a complementary metal-oxide semiconductor (CMOS).

The electrical signal, converted by the image sensor 2150, may be output as an image through a display unit of the portable electronic device 1.

The image sensor 2510 may be fixed to the printed circuit board 2530, and may be electrically connected to the printed circuit board 2530 by wire bonding.

The lens unit 2100 may be moved in the optical axis (Z-axis) direction. As an example, the lens unit 2100 may be relatively moved to the holder 2300 in the optical axis (Z-axis) direction.

As an example, the lens unit 2100 may be moved with respect to the holder 2300, in the optical axis (Z-axis) direction, to adjust a focus.

An actuator or a piezoactuator, including a magnet and a coil, may be used to move the lens unit 2100 in the optical axis (Z-axis) direction. As an example, the lens unit 2100 may be provided with a magnet, and the holder 2300 may be provided with a coil.

Accordingly, the lens unit 2100 may be moved with respect to the holder 2300 in the optical axis (Z-axis) direction by driving force of an actuator.

The first frame 3000 may be accommodated in the housing 1000. Each of the first frame 3000 and the housing 1000 may have a box shape with open top and bottom.

The first frame 3000 may rotate about the first axis (the X-axis), perpendicular to the optical axis (the Z-axis) ("yawing").

A configuration, rotating about the first axis (the X-axis), will be referred to as a first movable body 30. For example, the first movable body 30 may include a first frame 3000. The first movable body 30 may further include a first magnet 5100, a second ball member 7300, a second driving unit 6000, and a second cover 3900.

Since the lens module 2000 and the second frame 4000 are accommodated in the first frame 3000, the lens module 2000 and the second frame 4000 may also rotate about the first axis (the X-axis) together with the first frame 3000 as the first frame 3000 rotates.

The rotation of the first movable body 30 about the first axis (the X-axis) will be described later with reference to FIGS. 24 to 28B.

The second frame 4000 may be accommodated in the first frame 3000. The second frame 4000 may have a box shape with open top and bottom.

The second frame 4000 may rotate about the second axis (the Y-axis), perpendicular to both the optical axis (the Z-axis) and the first axis (the X-axis) ("pitching"). Since the lens module 2000 is accommodated in the second frame 4000, the lens module 2000 may also rotate in the second axis (the Y-axis) together with the second frame 4000 as the second frame 4000 rotates.

A configuration, rotating about the second axis (the Y-axis), will be referred to as a second movable body 50. For example, the second movable body 50 may include a lens module 2000 and a second frame 4000. The second movable body 50 may further include a second magnet 6100.

The second movable body 50 may rotate about the second axis (the Y-axis), and may rotate about the first axis (the X-axis) together with the first movable body 30.

The rotation of the second movable body 50 about the second axis (the Y-axis) will be described later with reference to FIGS. 29 to 33B.

The case 1700 may be coupled to the housing 1000 to cover the housing 1000. In addition, a connection substrate portion 9000 may be coupled to a lower portion of the housing 1000.

Figure 24:
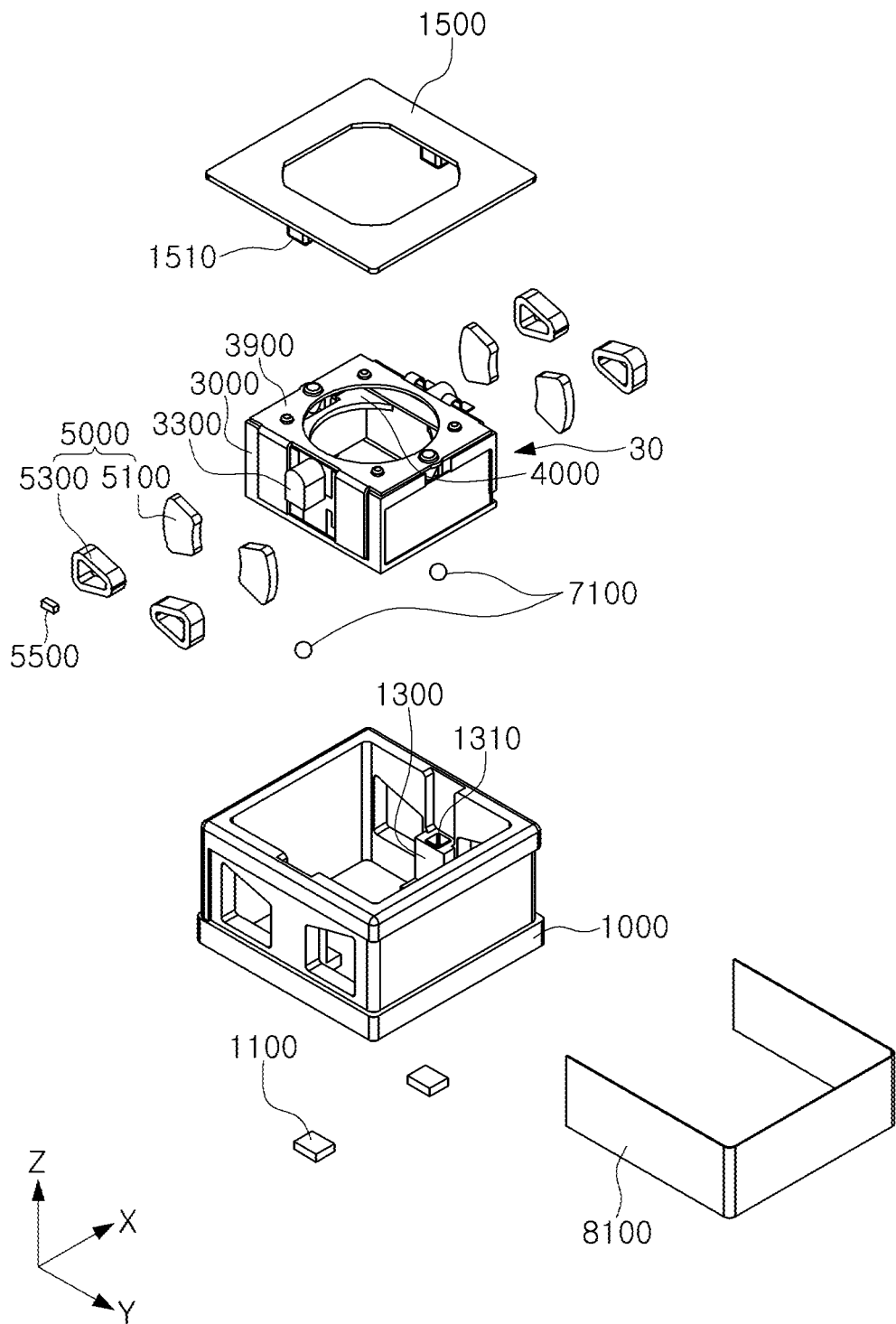
FIG. 24 is a schematic perspective view illustrating a state in which a first movable body is separated from a housing.

FIG. 24 is a schematic perspective view illustrating a state in which a first movable body is separated from a housing.

Figure 25A:
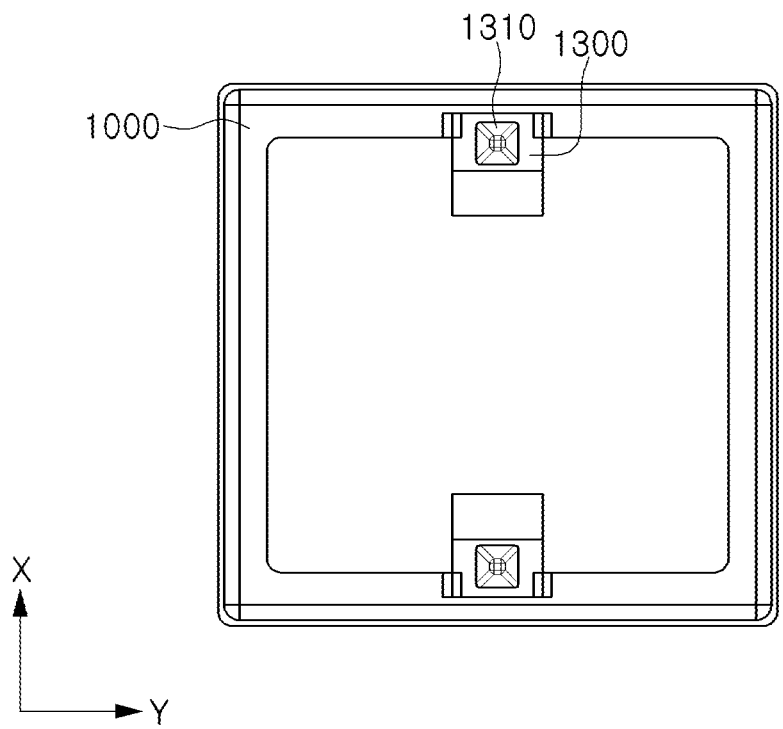
FIG. 25A is a plan view of the housing.
Figure 25B:
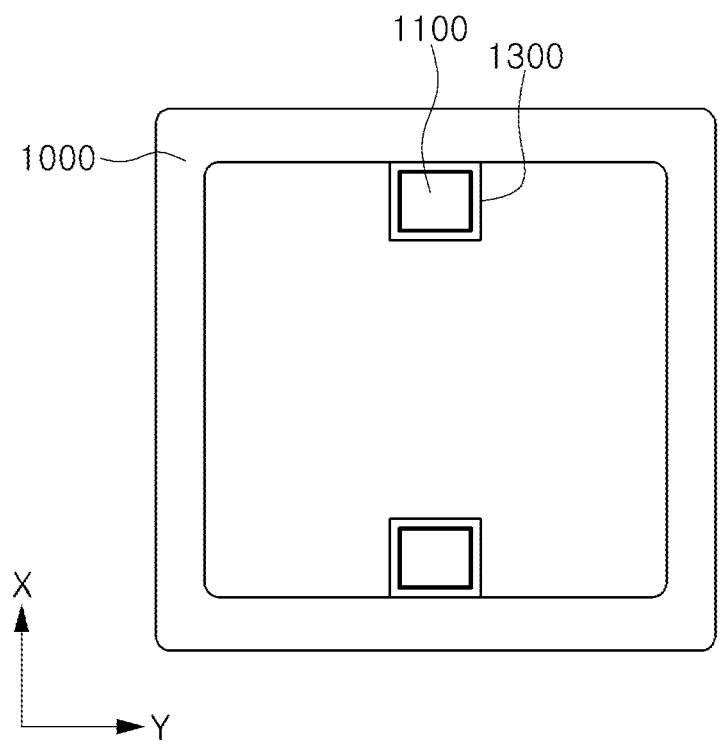
FIG. 25B is a bottom view of the housing.
Figure 25C:
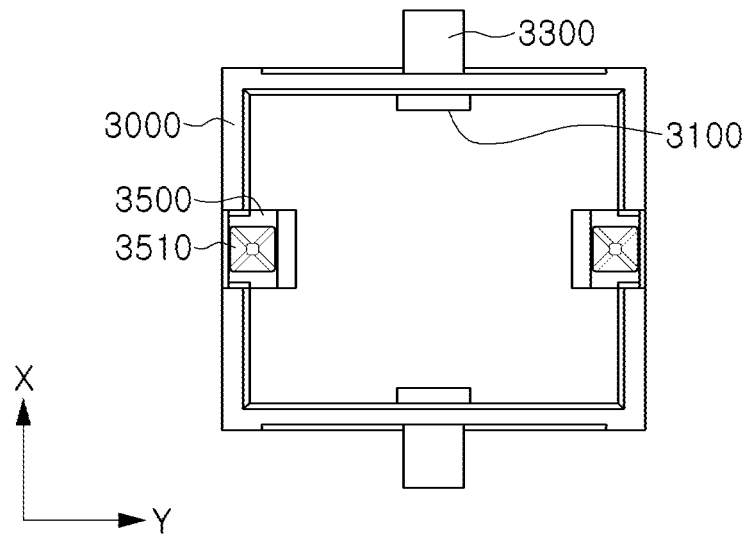
FIG. 25C is a plan view of a first frame.
Figure 25D:
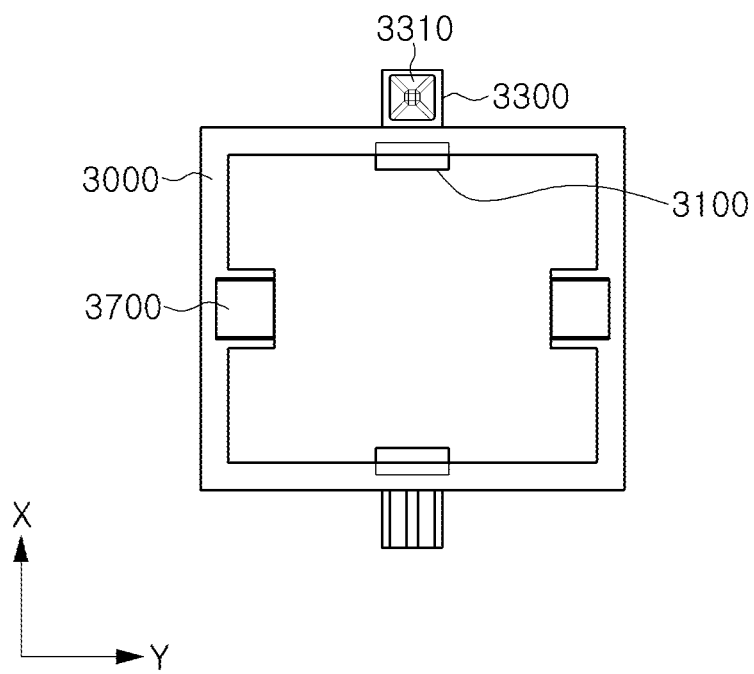
FIG. 25D is a bottom view of the first frame.

FIG. 25A is a plan view of the housing, FIG. 25B is a bottom view of the housing, FIG. 25C is a plan view of a first frame, and FIG. 25D is a bottom view of the first frame.

Figure 26A:
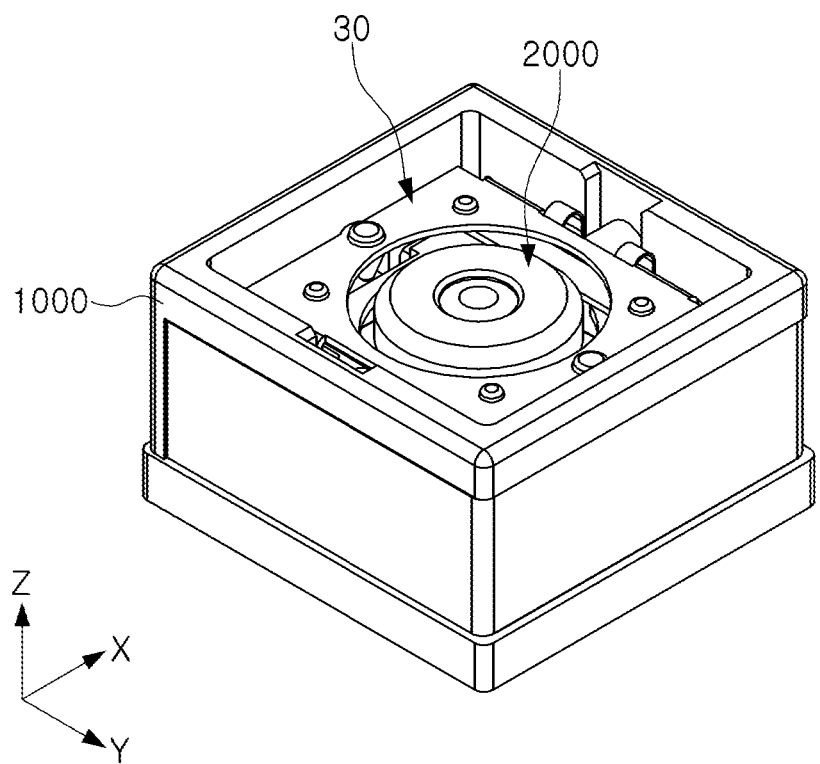
FIG. 26A to 26C views illustrating that a first movable body and a second movable body rotate about a first axis.
Figure 26B:
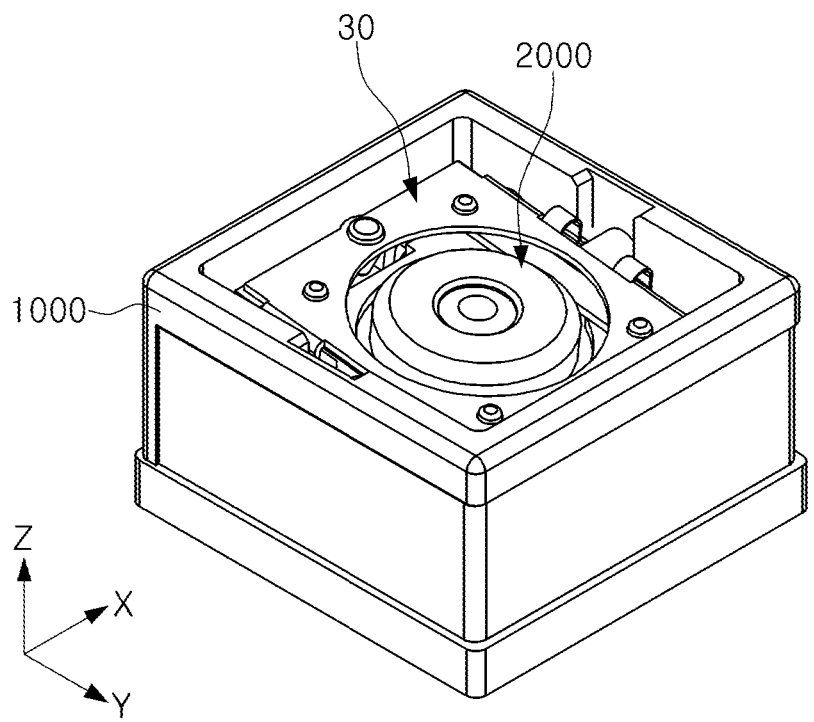
Figure 26C:
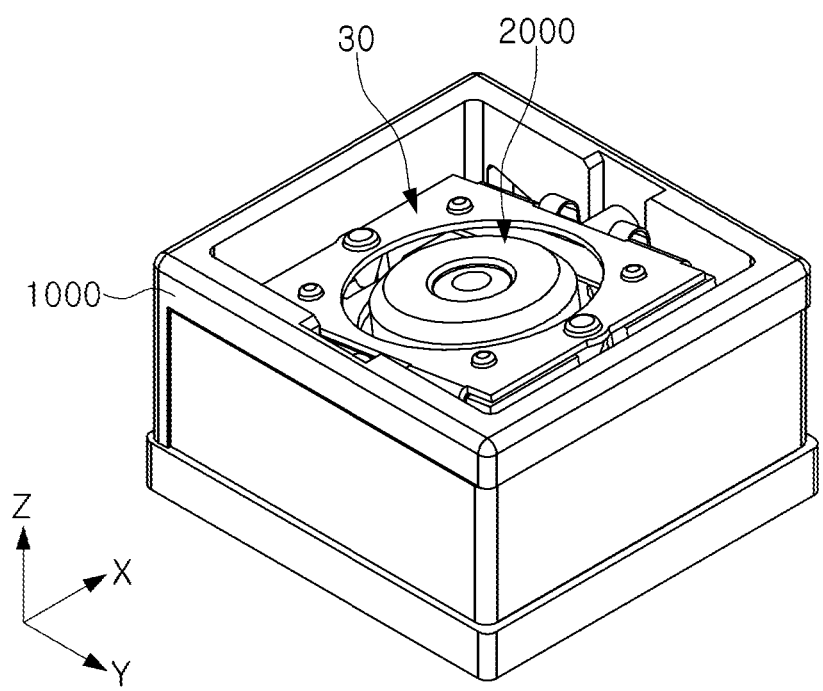

FIG. 26A to 26C views illustrating that a first movable body and a second movable body rotate about a first axis.

A first frame 3000 may be accommodated in a housing 1000, and may be provided to be relatively rotatable with respect to the housing 1000. For example, the first frame 3000 may rotate about a first axis (an X-axis), perpendicular to an optical axis (a Z-axis).

The first frame 3000 and the housing 1000 may be provided with a first guide unit supporting the rotation of the first frame 3000.

The first guide unit may include a first protrusion portion 3300, a first seating portion 1300, and a first ball member 7100. The first ball member 7100 may be disposed between the first protrusion portion 3300 and the first seating portion 1300.

The first frame 3000 may be provided with the first protrusion portion 3300 protruding from the first frame 3000. As an example, the first protrusion portion 3300 may extend from both side surfaces of the first frame 3000 in a first axis (X-axis) direction. The first protrusion portion 3300 may be provided as a pair of first protrusions (see FIGS. 24 and 25C).

The housing 1000 may be provided with the first seating portion 1300 facing the first protrusion portion 3300 in an optical axis (Z-axis) direction. Similar to the first protrusion portion 3300, the first seating portion 1300 may be provided as a pair of first protrusions 1300 (see FIGS. 24A and 25A).

The first protrusion portion 3300 may be provided with a first accommodation groove 3310. As an example, the first accommodation groove 3310 may be provided on a lower surface of the first protrusion portion 3300. The first accommodation groove 3310 may have a shape recessed from the lower surface of the first protrusion portion 3300, and have a tetrahedral or pentahedral shape with one open side. For example, the first accommodation groove 3310 may have a triangular pyramid shape, in which one side of a triangle is open, or a quadrangular pyramid shape in which one side of a quadrangle is open (see FIG. 25D).

The first accommodation groove 3310, provided in one of the pair of first protrusion portions 3300, may have a tetrahedral or pentahedral shape with one open side, and the first accommodation groove 3310, provided in the other first protrusion portion 3300, may have a 'V' shape (see FIG. 25D).

The first seating portion 1300 may be provided with a first seating groove 1310. As an example, the first seating groove 1310 may be provided in an upper surface of the first seating portion 1300. The first seating groove 1310 may be a shape recessed from an upper surface of the first seating portion 1300, and may have a tetrahedral or pentahedral shape with one open side. For example, the first seating groove 1310 may have a triangular pyramid shape, in which one side of a triangle is open, or a quadrangular pyramid shape in which one side of a quadrangle is open (see FIG. 25A).

The first receiving groove 3310 and the first seating groove 1310 may face each other in the optical axis (Z-axis) direction. A first ball member 7100 may be disposed between the first accommodation groove 3310 and the first seating groove 1310. The first ball member 7100 may include a plurality of ball members spaced apart from each other in the first axis (X-axis) direction.

Since the first accommodation groove 3310 and the first seating groove 1310 are respectively provided as a pair of the first accommodation grooves 3310 and a pair of first seating grooves 1310, the first ball member 7100 may also include a pair of ball members 7100.

One side of the first ball member 7100 may be in contact with the first accommodation groove 3310, and the other side thereof may be in contact with the first seating groove 1310.

The first frame 3000 may rotate about the first axis (the X-axis), while being supported by the first guide unit.

The driving unit 5000 may provide driving force to the first frame 3000. Referring to FIG. 24, the first driving unit 5000 may include a first magnet 5100, a first coil 5300, and a first substrate 8100.

The first magnet 5100 may be provided on the first frame 3000. As an example, the first magnet 5100 may be provided on one side surface of the first frame 3000.

The first magnet 5100 may include one or two magnets disposed on one side surface of the first frame 3000.

When the first magnet 5100 includes one magnet, the first magnet 5100 may be disposed to be offset from one side surface of the first frame 3000. When the first magnet 5100 includes two magnets, the two magnets may be disposed to be spaced apart from each other in a direction (for example, a second axis (Y-axis) direction), perpendicular to the optical axis (Z-axis) direction, based on a center of one side surface of the first frame 3000.

As another example, the first magnet 5100 may further include one or two magnets disposed on the other side surface of the first frame 3000. In FIG. 24, two magnets are illustrated as being disposed on each of one side surface and the other side surface of the first frame 3000.

The first coil 5300 may be provided on the first substrate 8100 to face the first magnet 5100. The first coil 5300 may be a copper clad pattern, stacked to be embedded in the first substrate 8100, or a winding coil provide on the first substrate 8100. The first substrate 8100 may be coupled to the housing 1000.

The first coil 5300 may include a number of coils, corresponding to the number of the first magnets 5100.

The first magnet 5100 and the first coil 5300 may be disposed to face each other in a direction, perpendicular to the optical axis (the Z-axis). For example, the first magnet 5100 and the first coil 5300 may be disposed to face each other in the first direction (the X-axis direction).

A surface of the first magnet 5100, facing the first coil 5300, may be provided with a first pole and a second pole magnetized in the optical axis (Z-axis) direction. The surface of the first magnet 5100, facing the first coil 5300, may be provided with a first pole, a neutral zone, and a second pole. The first pole may be an N-pole or an S-pole, and the second pole may be opposite to the first pole (an S-pole or an N-pole). The neutral zone may be provided between the first pole and the second pole.

The first magnet 5100 and the first coil 5300 may generate driving force in a direction, perpendicular to a direction in which they face each other. For example, the first magnet 5100 and the first coil 5300 may generate driving force in the optical axis (Z-axis) direction.

Accordingly, the driving force of the first magnet 5100 and the first coil 5300 may allow the first frame 3000 to rotate about the first axis (the X-axis).

Since the lens module 2000 and the second frame 4000 are accommodated in the first frame 3000, the lens module 2000 and the second frame 4000 may also rotate together with the first frame 3000 as the first frame 3000 rotates (see FIGS. 26A to 26C).

When the first frame 3000 rotates about the first axis (X-axis), the first magnet 5100 may be a moving member rotating together with the first frame 3000, and the first coil 5300 may be a fixed member.

The first magnet 5100 may have a rounded shape. As an example, the first magnet 5100 has a circular arc shape.

An internal side surface (a surface facing a rotation center point and an external side surface (a surface opposing the internal side surface) of the first magnet 5100 may each have a rounded shape.

An inscribed circle, in contact with the internal side surface of the first magnet 5100, and a circumscribed circle, in contact with the external side surface of the first magnet 5100, may be concentric circles.

When the first magnet 5100 includes two magnets disposed on one side surface of the first frame 3000, the inscribed circle, in contact with an internal side surface of each of the two magnets, and the circumscribed circle, in contact with an internal side surface of each of the two magnets, may be concentric circles.

The first substrate 8100 may be provided with a first position measurement unit 5500. As an example, the first position measurement unit 5500 may be disposed in a hollow portion of the first coil 5300 to face the first magnet 5100. The first position measurement unit 5500 may detect a position of the first frame 3000 when the first frame 3000 rotates about the first axis (the X-axis).

The first position measurement unit 5500 may be a Hall sensor.

Figure 27A:
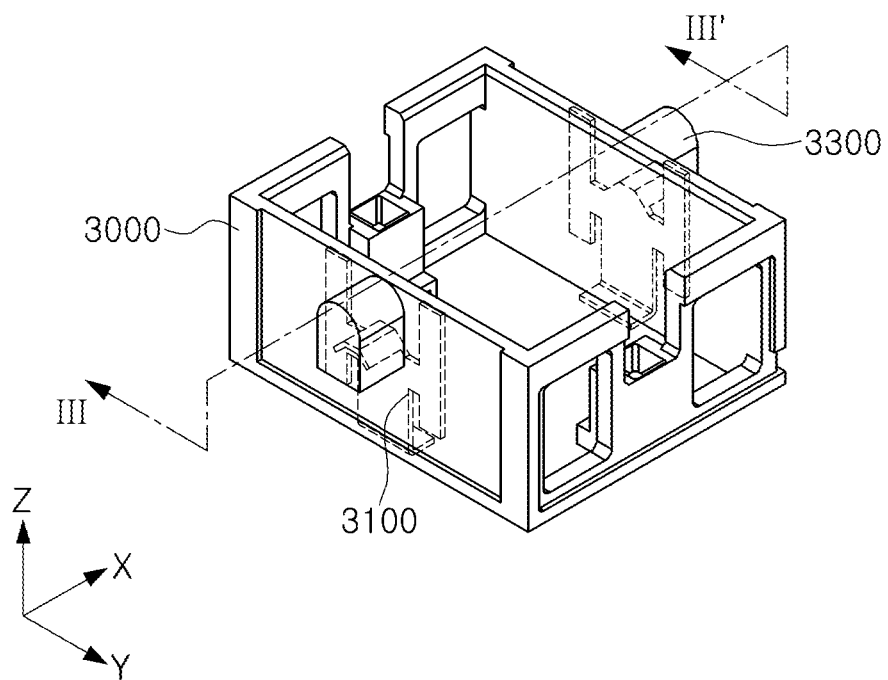
FIG. 27A is a perspective view of a first frame.
Figure 27B:
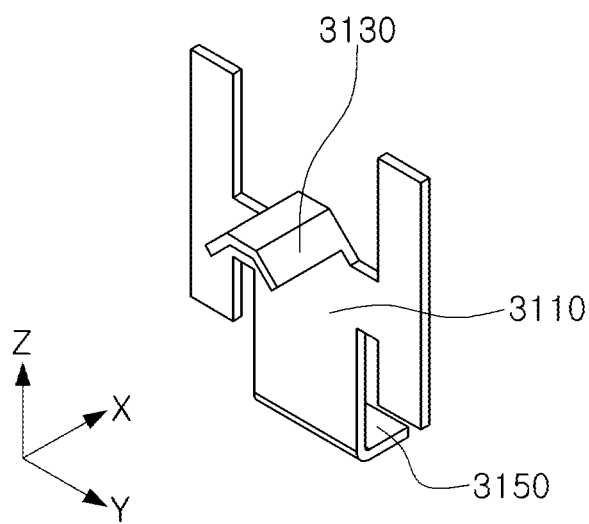
FIG. 27B is a perspective of a first yoke portion.
Figure 27C:
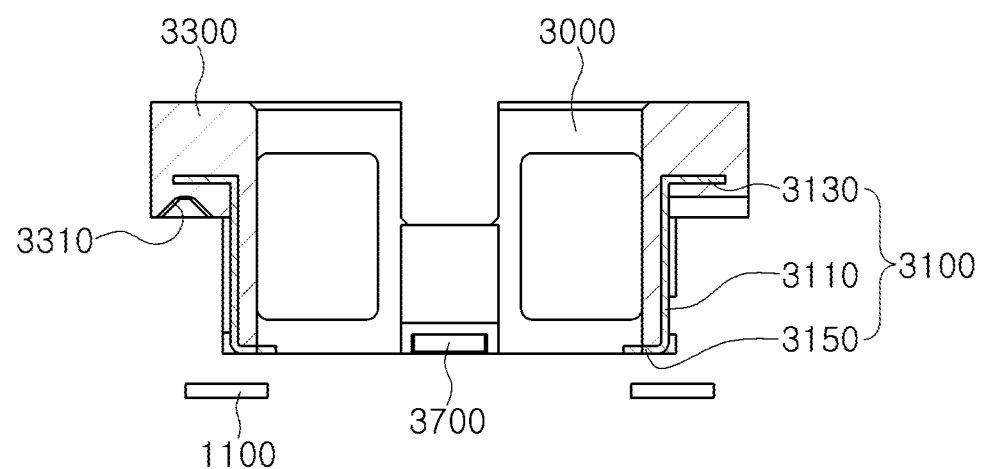
FIG. 27C is a cross-sectional view taken along line III-III' of FIG. 27A.

FIG. 27A is a perspective view of a first frame, FIG. 27B is a perspective of a first yoke portion, and FIG. 27C is a cross-sectional view taken along line III-III' of FIG. 27A.

Referring to FIGS. 27A to 27C, a first frame 3000 may be provided with a first yoke portion 3100.

A portion of the first yoke portion 3100 may be disposed inside the first frame 3000, and the other portions of the first yoke portion 3100 may be disposed to be exposed outwardly of the first frame 3000. For example, the first yoke portion 3100 may be integrally coupled to the first frame 3000 by insert injection. In this case, the first yoke portion 3100 may be manufactured to be integrated with the first frame 3000 by injecting a resin material into a mold in the state in which the first yoke portion 3100 is fixed within the mold.

The first frame 3000 may be formed of a plastic material, and the first yoke portion 3100 may be formed of a metal material. Since the first frame 3000 is provided with the first yoke portion 3100, rigidity of the first frame 3000 may be improved.

The first yoke portion 3100 may include a first body portion 3110, a first reinforcing portion 3130, and a first extension portion 3150.

The first body portion 3110 may be disposed inside the first frame 3000 or may be provided on a side surface of the first frame 3000 to be exposed outwardly of the first frame 3000.

A first reinforcing portion 3130 may extend from one side of the first body portion 3110 in a first axis (X-axis) direction, and may be disposed in a first protrusion portion 3300 of the first frame 3000. The first reinforcing portion 3130 may be disposed to surround at least a portion of a first accommodation groove 3310 within the first protruding portion 3300. Accordingly, the first accommodation groove 3310 may be prevented from being damaged by friction between the first ball member 7100 and the first receiving groove 3310, or the like.

The first extension portion 3150 may extend in the first axis (X-axis) direction from the other side of the first body portion 3110. The first extension portion 3150 may be disposed to protrude outwardly of the first frame 3000. For example, the first extension portion 3150 may protrude from the first frame 3000 in the direction of the first axis (X-axis).

A first pulling magnet 1100 may be disposed in a position facing the first extension portion 3150 in an optical axis (Z-axis) direction.

Since attractive force acts between the first extension portion 3150 and the first pulling magnet 1100 and the first frame 3000 is pulled toward the first pulling magnet 1100 by the attractive force, a first ball member 7100 may be maintained in a contact state with the first frame 3000 and the housing 1000.

The first pulling magnet 1100 may be provided on the housing 1000 to face the first extension portion 3150 in an optical axis (Z-axis) direction. As an example, the first pulling magnet 1100 may be disposed on a lower surface of the first seating portion 1300 of the housing 1000 (see FIG. 25B).

A center of the first extension portion 3150 and a center of the first pulling magnet 1100 may be respectively disposed in positions spaced apart from the first axis (the X axis), a rotation axis, in the optical axis (Z-axis) direction.

Even if the first frame 3000 is pressed to the housing 1000 in the optical axis (Z-axis) direction by attractive force between the first extension portion 3150 and the first pulling magnet 1100, contact states between the first ball member 7100, and the first frame 3000 and the housing 1000 may be released when unexpected impact, or the like, is applied during use of the camera module 2. In addition, the first ball member 7100 may be separated.

To prevent the release of the contact states and the separation of the first ball member 7100, a first cover 1500 may be coupled to the housing 1000. The first cover 1500 may be coupled to the housing 1000 to cover a portion of the open top of the housing 1000 (see FIG. 24).

The first cover 1500 may include a first stopper 1510 protruding to the first protrusion portion 3300 of the first frame 3000. The first stopper 1510 may be formed of an elastic material.

Figure 33A:
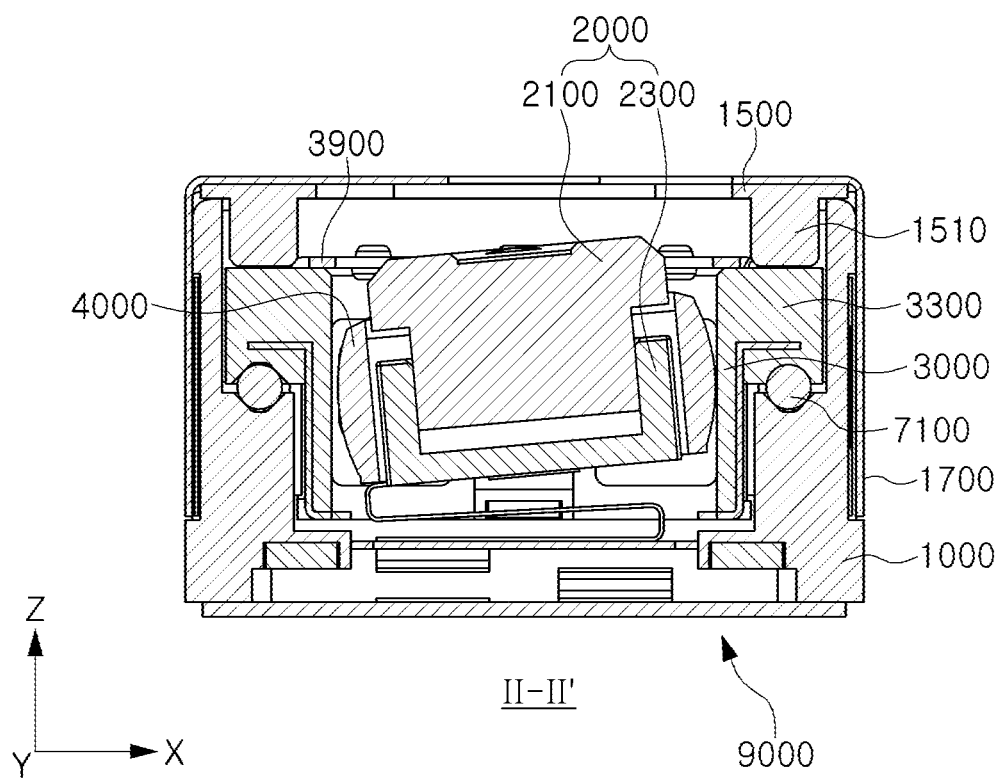
FIGS. 33A and 33B are cross-sectional views taken along line II-II of FIG. 22.
Figure 33B:
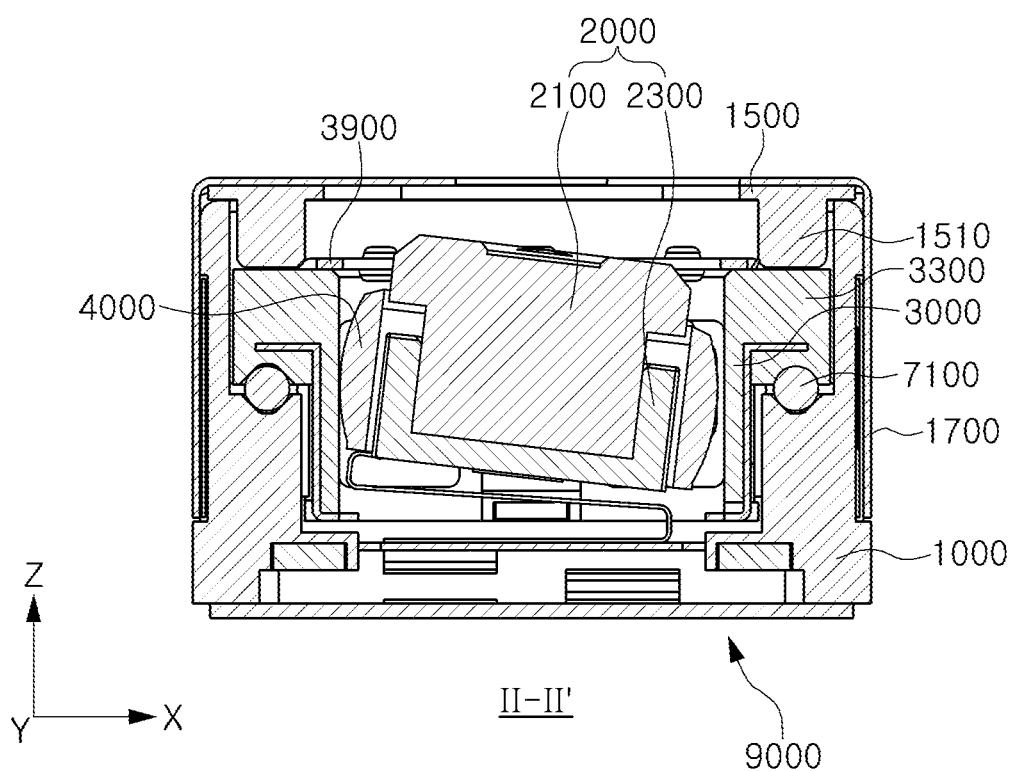

Since the first stopper 1510 is disposed above the first protrusion 3300, the first ball member 7100 may be prevented from being separated between the first frame 3000 and the housing 1000 (see FIGS. 33A and 33B).

The first stopper 1510 may be in contact with the first protrusion portion 3300. A contact surface between the first stopper 1510 and the first protrusion portion 3300 may be a rounded curved surface.

As an example, at least one of a lower surface of the first stopper 1510 and an upper surface of the first protrusion 3300 may be a rounded curved surface. The first stopper 1510 and the first protrusion portion 3300 may be in point or line contact with each other.

Accordingly, even when the first stopper 1510 and the first protrusion portion 3300 are in contact with each other, a rotational motion of the first frame 3000 may not be affected.

Figure 28A:
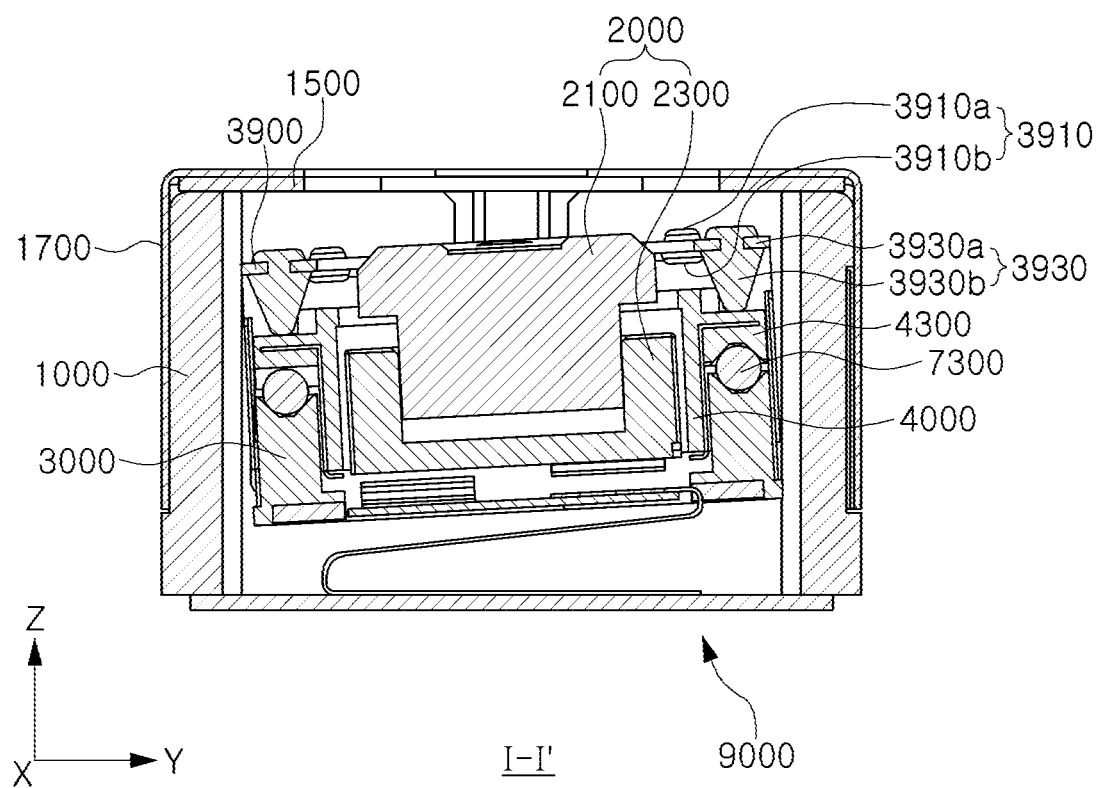
FIGS. 28A and 28B are cross-sectional views taken along line I-I' of FIG. 22.
Figure 28B:
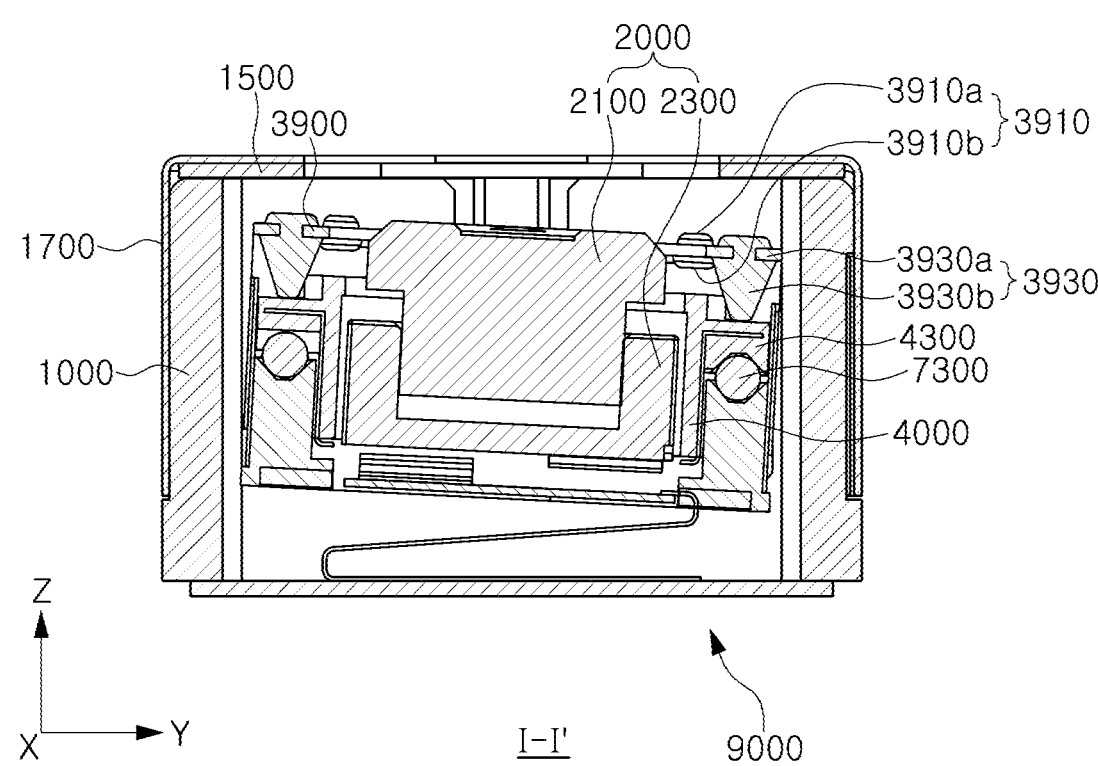

FIGS. 28A and 28B are cross-sectional views taken along line I-I' of FIG. 22.

Referring to FIGS. 28A and 28B, the first frame 3000 may rotate about the first axis (the X-axis). Since the second frame 4000 and the lens module 2000 are accommodated in the first frame 3000, the second frame 4000 and the lens module 2000 may rotate about the first axis (the X-axis) together with the first frame 3000.

The lens module 2000 may be provided with an image sensor module 2500. The image sensor module 2000 may also rotate together with the image sensor module 2500.

The image sensor module 2500 may be connected to a connection substrate portion 9000, and the connection substrate portion 9000 may be configured to be partially moved or bent in a vertical direction as the image sensor module 2500 rotates. The configuration of the connection substrate portion 9000 will be described later with reference to FIGS. 34 to 37B.

Figure 29:
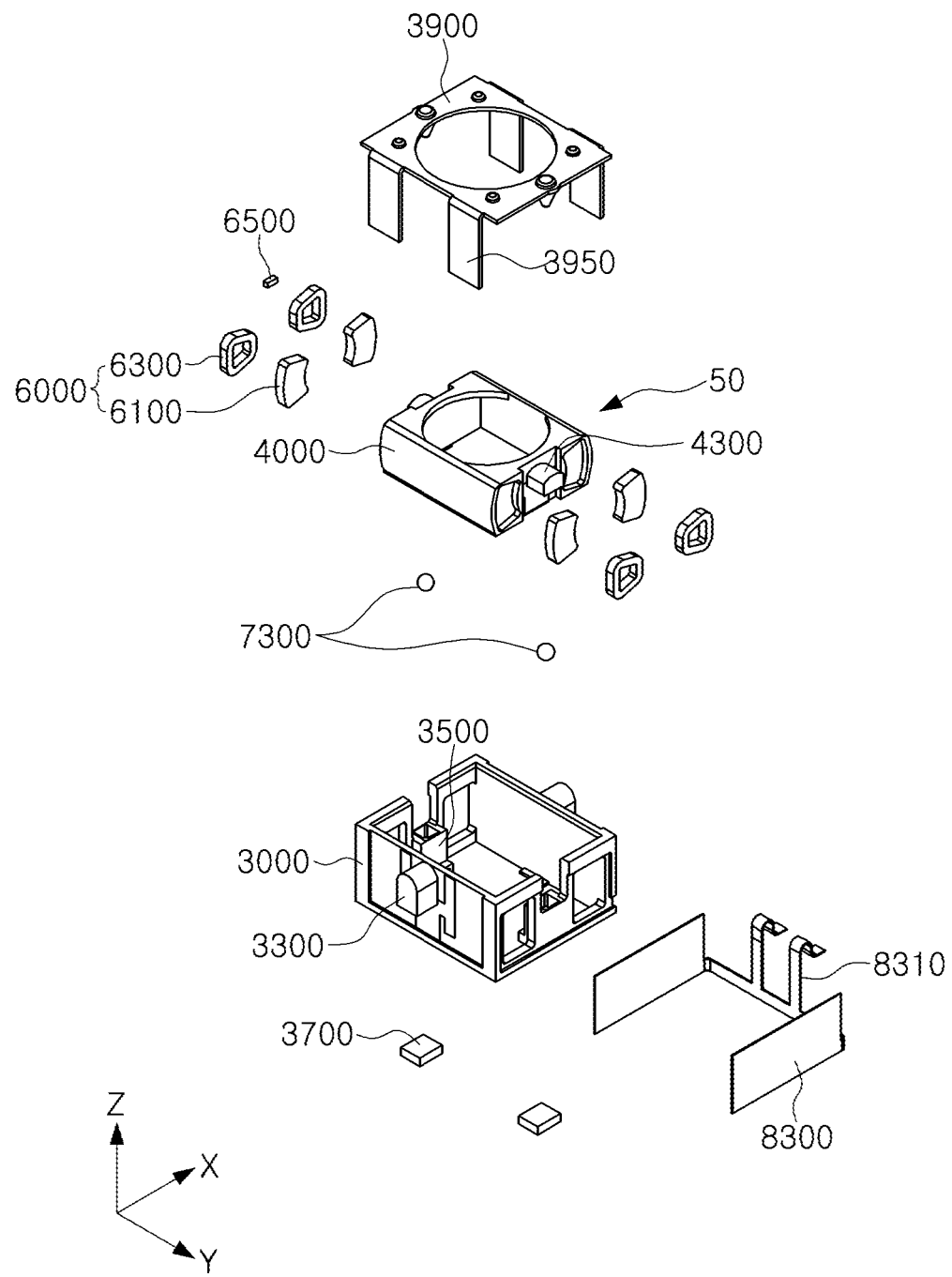
FIG. 29 is a perspective view illustrating a state in which a first frame and a second frame are separated from each other.

FIG. 29 is a perspective view illustrating a state in which a first frame and a second frame are separated from each other.

Figure 30A:
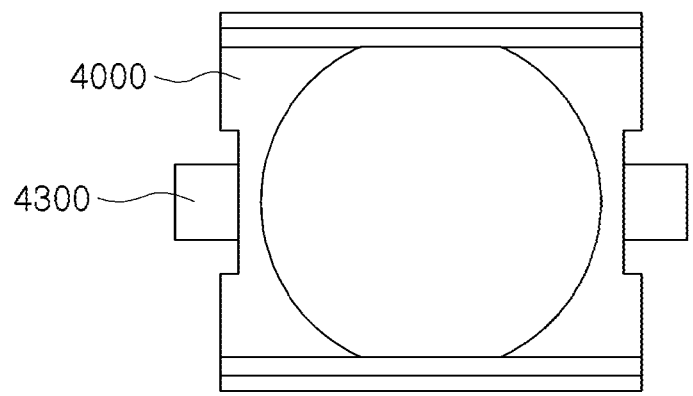
FIG. 30A is a plan view of the second frame.
Figure 30B:
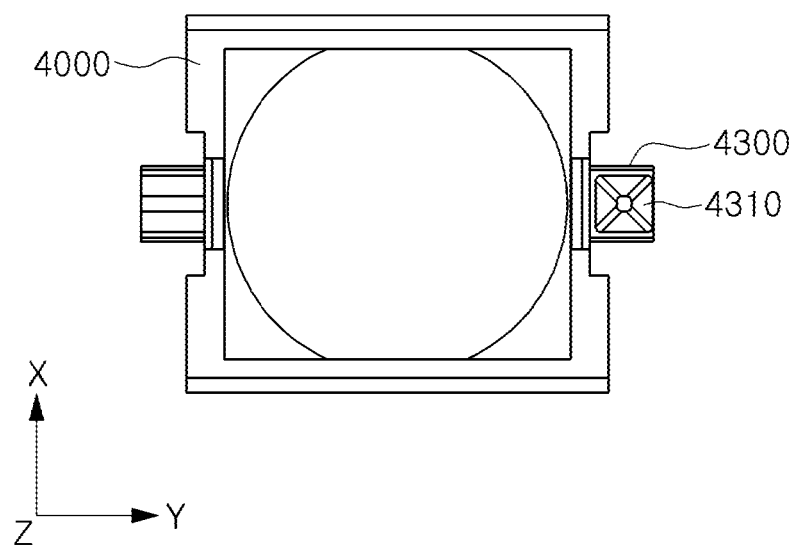
FIG. 30B is a bottom view of the second frame.

FIG. 30A is a plan view of the second frame, and FIG. 30B is a bottom view of the second frame.

Figure 31A:
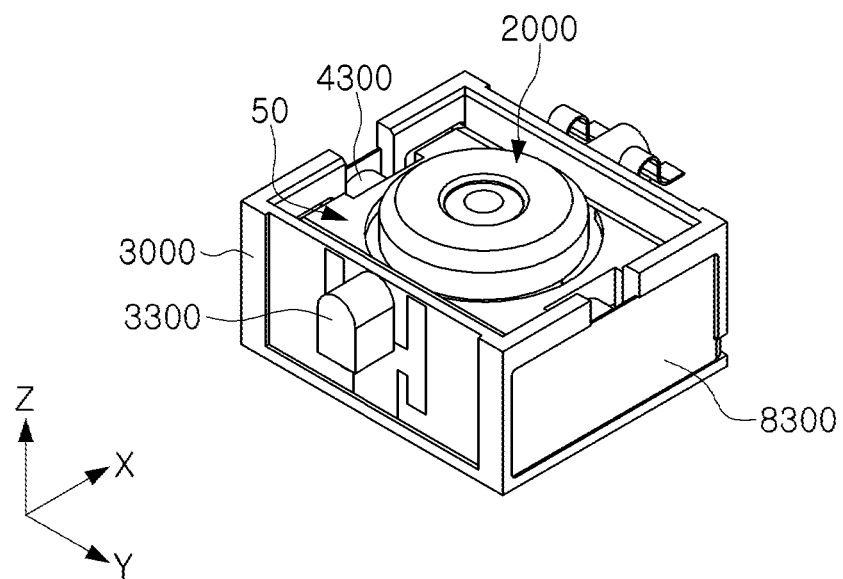
FIGS. 31A, 31B, and 31C are views illustrating that a second movable body rotates about a second axis.
Figure 31B:
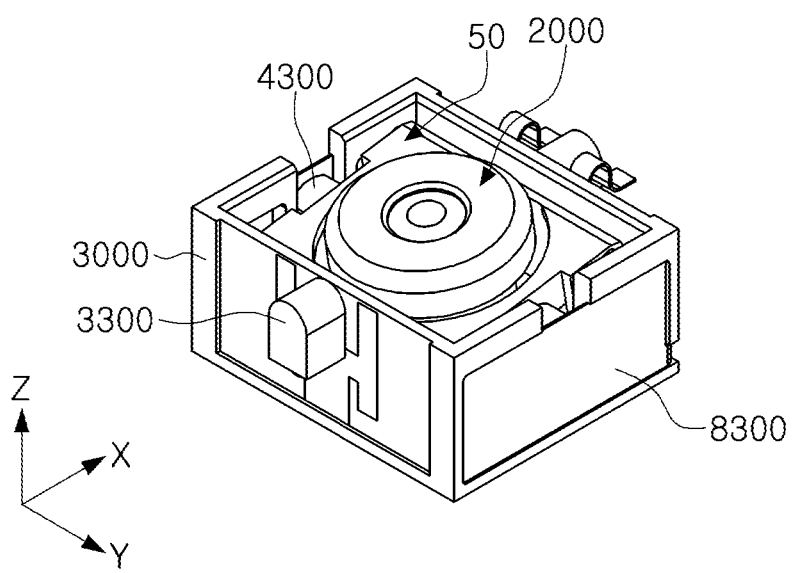
Figure 31C:
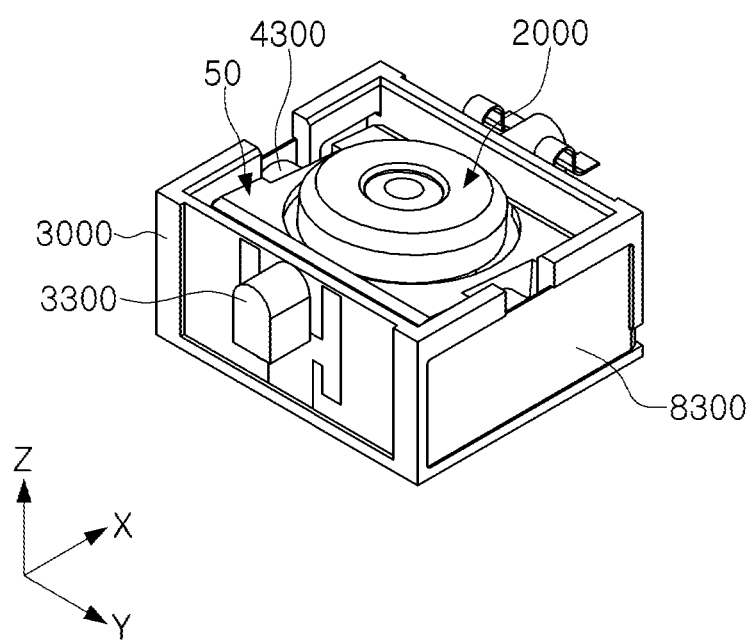

FIGS. 31A to 31C are views illustrating that a second movable body rotates about a second axis.

The second frame 4000 may be accommodated in the first frame 3000 and may be provided to be relatively rotatable with respect to the first frame 3000. For example, the second frame 4000 may rotate about a second axis (a Y-axis), perpendicular to both an optical axis (a Z-axis) and a first axis (an X-axis).

Although a lens module 2000 is not illustrated in FIG. 29 for ease of description, referring to FIG. 23, the lens module 2000 may be accommodated in the second frame 4000, and the lens module 2000 may rotate together with the second frame 4000.

The second frame 4000 and the first frame 3000 may be provided with a second guide portion supporting rotation of the second frame 4000.

The second guide portion may include a second protrusion portion 4300, a second seating portion 3500, and a second ball member 7300. The second ball member 7300 may be disposed between the second protrusion portion 4300 and the second seating portion 3500.

The second frame 4000 may be provided with a second protrusion portion 4300 protruding from the second frame 4000. As an example, the second protrusion portion 4300 may extend from both side surfaces of the second frame 4000 in a second axis (Y-axis) direction. The second protrusion portion 4300 may be provided as a pair of second protrusion portions 4300 (see FIGS. 29, 30A, and 30B).

For the reference, a direction, in which the first protrusion portion 3300 protrudes, and a direction, in which the second protrusion portion 4300 protrudes, may be perpendicular to each other.

The first frame 3000 may be provided with a second seating portion 3500 facing the second protrusion portion 4300 in the optical axis (Z-axis) direction. Similar to the second protrusion portion 4300, the second seating portion 3500 may be provided as a pair of second seating portions 3500 (see FIGS. 24, 25A, and 29).

In the first frame 3000, a direction, in which the pair of first protrusion portions 3000 oppose each other, and a direction, in which the pair of the second seating portions 3500 oppose each other, may be perpendicular to each other.

The first protrusion portion 3300 may protrude outwardly of the first frame 3000 in the first axis (X-axis) direction, and the second seating portion 3500 may protrude inwardly of the first frame 3000 in the second axis (Y-axis) direction. In the first frame 3000, the second seating portion 3500 may have open top such that the second protrusion portion 4300 of the second frame 4000 may be disposed.

The second protrusion portion 4300 may be provided with a second accommodation groove 4310. As an example, the second accommodation groove 4310 may be provided on a lower surface of the second protrusion portion 4300. The second accommodation groove 4310 may have a shape recessed from the lower surface of the second protrusion portion 4300, and may have a tetrahedral or pentahedral shape with open one side. For example, the second accommodation groove 4310 may have a triangular pyramid shape, in which one side of a triangle is open, or a quadrangular pyramid shape in which one side of a quadrangle is open (see FIG. 30B).

The second accommodation groove 4310, provided in one of the pair of second protrusion portions 4300, may have a tetrahedral or pentahedral shape with one open side, and the second accommodation groove 4310, provided in the other second protrusion portion 4300, may have a 'V' shape (see FIG. 30B).

The second seating portion 3500 may be provided with a second seating groove 3510. As an example, the second seating groove 3510 may be provided in an upper surface of the second seating portion 3500. The second seating groove 3510 may have a shape recessed from an upper surface of the second seating portion 3500, and may have may have a tetrahedral or pentahedral shape with open one side. For example, the second seating groove 3510 may have a triangular pyramid shape, in which one side of a triangle is open, or a quadrangular pyramid shape in which one side of a quadrangle is open (see FIG. 25C).

The second accommodation groove 4310 and the second seating groove 3510 may face each other in the optical axis (Z-axis) direction. A second ball member 7300 may be disposed between the second accommodation groove 4310 and the second seating groove 3510. The second ball member 7300 may include a plurality of ball members spaced apart from each other in the second axis (Y-axis) direction.

Since the second accommodation groove 4310 is provided as a pair of second accommodation grooves 4310 and a second seating groove 3510 is provided as a pair of second seating grooves 3510, the second ball member 7300 may include a pair of ball members.

One side of the second ball member 7300 may be in contact with the second accommodation groove 4310, and the other side of the second ball member 7300 may be in contact with the second seating groove 3510.

The second frame 4000 may rotate about the second axis (the Y-axis), while being supported by the second guide portion.

The second driving unit 6000 may provide driving force to the second frame 4000. Referring to FIG. 29, the second driving unit 6000 may include a second magnet 6100, a second coil 6300, and a second substrate 8300.

The second magnet 6100 may be provided on the second frame 4000. For example, the second magnet 6100 may be provided on one side surface of the second frame 4000.

The second magnet 6100 may include one or two magnets disposed on one side surface of the second frame 4000.

When the second magnet 6100 includes one magnet, the second magnet 6100 may be disposed to be offset from one side surface of the second frame 4000. When the second magnet 6100 includes two magnets, the two magnets may be disposed to be spaced apart from each other in a direction (for example, a first axis (X-axis) direction), perpendicular to the optical axis (Z-axis) direction, based on a center of one side surface of the second frame 4000.

As another example, the second magnet 6100 may further include one or two magnets disposed on the other side surface of the second frame 4000. In FIG. 29, two magnets are illustrated as being disposed on each of one side surface and the other side surface of the second frame 4000.

For the reference, a surface of the first frame 3000, on which the first magnet 5100 is disposed, and a surface of the second frame 4000, on which the second magnet 6100 is disposed, may be perpendicular to each other.

The second coil 6300 may be provided on the second substrate 8300 to face the second magnet 6100. The second coil 6300 may be a copper clad pattern, stacked to be embedded in the second substrate 8300, or a winding coil provide on the second substrate 8300.

The second substrate 8300 may be coupled to the first frame 3000. The second substrate 8300 may be electrically connected to the first substrate 8100 coupled to the housing 1000. The second substrate 8300 may be a flexible circuit board.

Since the first frame 3000 is configured to rotate about a first axis (an X axis) and the second substrate 8300 is coupled to the first frame 3000, the second substrate 8300 may also rotate about the first axis (the X axis) together with the frame 3000.

The second substrate 8300 may include a connection portion 8310 connected to the first substrate 8100 coupled to the housing 1000. The connection portion 8310 may extend from the second substrate 8300, and an end portion of the connection portion 8310 may have a bent shape.

The connection portion 8310 may have a shape of a flexible film, on which a conductive material is patterned, or a shape in which a plurality of cables is extended.

Accordingly, when the second substrate 8300 rotates about the first axis (the X-axis) together with the first frame 3000, the connection portion 8310 may be bent.

The second coil 6300 may include a number of coils, corresponding to the number of the second magnets 6100.

The second magnet 6100 and the second coil 6300 may be disposed to face each other in a direction, perpendicular to the optical axis (the Z-axis). For example, the second magnet 6100 and the second coil 6300 may be disposed to face each other in the first direction (the X-axis direction).

A surface of the second magnet 6100, facing the second coil 6300, may be provided with a first pole and a second pole magnetized in the optical axis (Z-axis) direction. The surface of the second magnet 6100, facing the second coil 6300, may be provided with a first pole, a neutral zone, and a second pole sequentially disposed in the optical axis (Z-axis) direction. The first pole may be an N-pole or an S-pole, and the second pole may be opposite to the first pole (an S-pole or an N-pole). The neutral zone may be provided between the first pole and the second pole.

The second magnet 6100 and the second coil 6300 may generate driving force in a direction, perpendicular to a direction in which they face each other. For example, the second magnet 6100 and the second coil 6300 may generate driving force in the optical axis (Z-axis) direction.

Accordingly, the second frame 4000 may rotate about the second axis (the Y-axis) due to the driving force generated by the second magnet 6100 and the second coil 6300.

Since the lens module 2000 is accommodated in the second frame 4000, the lens module 2000 may also rotate together with the second frame 4000 as the second frame 4000 rotates (see FIGS. 31A to 31C).

When the second frame 4000 rotates about the second axis (the Y-axis), the second magnet 6100 may a movable member rotating together with the second frame 4000, and the second coil 6300 may be a fixed member.

The second magnet 6100 has a rounded shape. As an example, the second magnet 6100 has a circular arc shape.

An internal side surface (a surface facing a rotation center point) and an external side surface (a surface opposing the internal side surface) of the second magnet 6100 may have a rounded shape.

An inscribed circle, in contact with the internal side surface of the second magnet 6100, and a circumscribed circle, in contact with the external side surface of the second magnet 6100, may be concentric circles.

When the second magnet 6100 includes two magnets disposed on one side surface of the second frame 4000, an inscribed circle, in contact with an internal surface of each of the two magnets, and a circumscribed circle, in contact with an external surface of each of the two magnets, may be concentric circles.

A second position measurement unit 6500 may be provided on the second substrate 8300. For example, the second position measurement unit 6500 may be disposed in a hollow portion of the second coil 6300 to face the second magnet 6100. The second position measurement unit 6500 may detect a position of the second frame 4000 when the second frame 4000 rotates about the second axis (the Y-axis).

The second position measuring unit 6500 may be a Hall sensor.

Figure 32A:
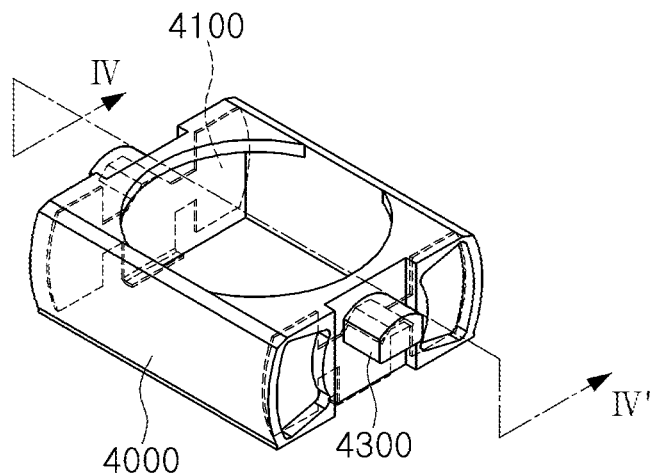
FIG. 32A is a perspective view of the second frame.
Figure 32B:
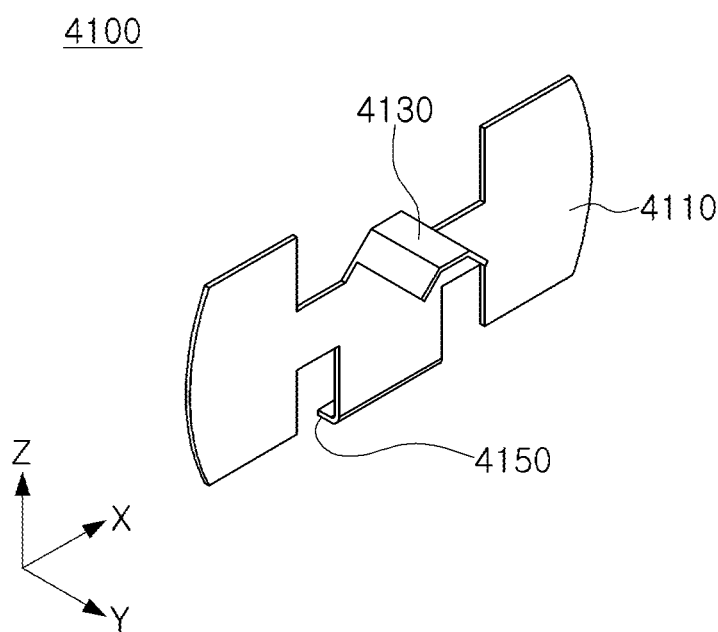
FIG. 32B is a perspective view of a second yoke portion.
Figure 32C:
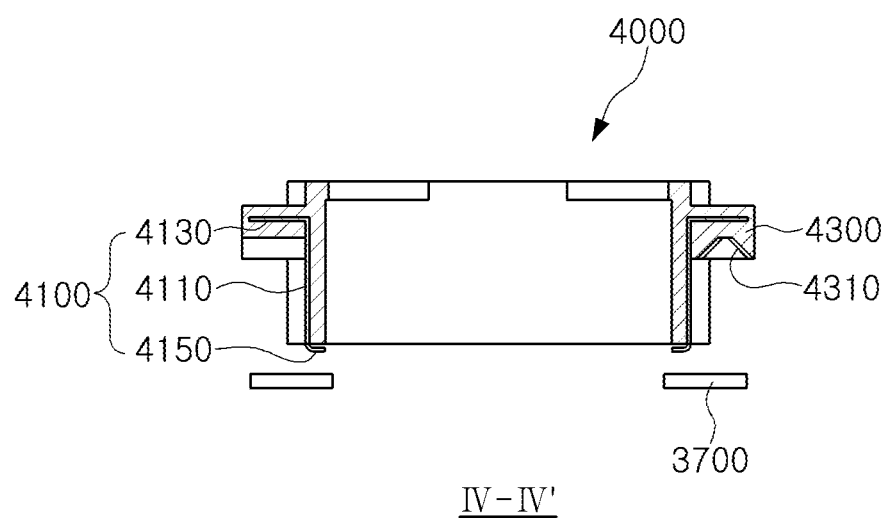
FIG. 32C is a cross-sectional view taken along line IV-IV' of FIG. 32A.

FIG. 32A is a perspective view of the second frame, FIG. 32B is a perspective view of a second yoke portion, and FIG. 32C is a cross-sectional view taken along line IV-IV' of FIG. 32A.

Referring to FIGS. 32A to 32C, the second frame 4000 may be provided with the second yoke portion 4100.

One portion of the second yoke portion 4100 may be disposed inside the second frame 4000, and the other portion of the second yoke portion 4100 may be disposed outside the second frame 4000. For example, the second yoke portion 4100 may be integrally coupled to the second frame 4000 by insert injection. In this case, the second yoke portion 4100 may be manufactured to be integrated with the second frame 4000 by injecting a resin material into a mold in the state in which the second yoke portion 4100 is fixed within the mold.

The second frame 4000 may be formed of a plastic material, and the second yoke portion 4100 may be formed of a metal material. Since the second yoke portion 4100 is provided in the second frame 4000, rigidity of the second frame 4000 may be improved.

The second yoke portion 4100 may include a second body portion 4110, a second reinforcing portion 4130, and a second extension portion 4150.

The second body portion 4110 may be disposed inside the second frame 4000, or may be provided on a side surface of the second frame 4000 to be exposed outwardly of the second frame 4000. The second body portion 4110 may serve to focus magnetic force of the second magnet 6100. Accordingly, leakage magnetic flux may be prevented from occurring.

The second reinforcing portion 4130 may extend from one side of the second body portion 4110 in the second axis (Y-axis) direction, and may be disposed in the second protrusion portion 4300 of the second frame 4000. The second reinforcing portion 4130 may be disposed to surround at least a portion of the second accommodation groove 4310 within the second protrusion portion 4300. Accordingly, the second accommodation groove 4310 may be prevented from being damaged by friction between the second ball member 7300 and the second accommodation groove 4310, or the like.

The second extension portion 4150 may extend from the other side of the second body portion 4110 in the second axis (Y-axis) direction. The second extension portion 4150 may be disposed to protrude outwardly of the second frame 4000. For example, the second extension portion 4150 may protrude from the second frame 4000 in the second axis (Y-axis) direction.

A second pulling magnet 3700 may be disposed in a position facing the second extension portion 4150 in the optical axis (Z-axis) direction.

Since attractive force acts between the second extension portion 4150 and the second pulling magnet 3700 and the second frame 4000 is pulled toward the second pulling magnet 3700 by the attractive force, a second ball member 7300 may be maintained in a contact state with the second frame 4000 and the first frame 3000.

The second pulling magnet 3700 is provided on the housing 1000 to face the first extension portion 3150 in an optical axis (Z-axis) direction. As an example, the second pulling magnet 3700 may be disposed on a lower surface of the second seating portion 3500 of the frame 3000 (see FIG. 25D).

A center of the second extension portion 4150 and a center of the second pulling magnet 3700 may be respectively disposed in positions spaced apart from the first axis (the X axis), a rotation axis, in the optical axis (Z-axis) direction.

Even if the second frame 4000 is pressed to the first frame 3000 in the optical axis (Z-axis) direction by attractive force between the second extension portion 4150 and the second pulling magnet 4100, contact states between the second ball member 7300, and the second frame 4000 and the first frame 3000 may be released when unexpected impact, or the like, is applied during use of the camera module 2. In addition, the second ball member 7300 may be separated.

To prevent the release of the contact states and the separation of the second ball member 7300, a second cover 3900 may be coupled to the first frame 3000 to cover a portion of the open top of the first frame 3000 (see FIG. 29).

The second cover 3900 may be provided with a coupling portion 3950 extending in the optical axis (Z axis) direction. The coupling portion 3950 may be coupled to a side surface of the first frame 3000. The first magnet 5100 may be attached to the side surface of the first frame 3000 or may be attached to the coupling portion 3950.

The second cover 3900 may include a second stopper 3930. The second stopper 3930 may be formed of an elastic material (see FIGS. 28A and 28B).

The second stopper 3930 may include a first buffer portion 3930a, protruding upwardly of the second cover 3900, and a second buffer portion 3930b protruding downwardly of the second cover 3900. The second buffer portion 3930b may protrude to the second protrusion portion 4300 of the second frame 4000.

Since the second stopper 3930 is disposed above the second protrusion portion 4300, the second ball member 7300 may be prevented from being separated between the second frame 4000 and the first frame 3000 (see FIGS. 28A and 28B).

The second stopper 3930 may be in contact with the second protrusion portion 4300. A contact surface between the second stopper 3930 and the second protrusion portion 4300 may be a rounded curved surface.

As an example, at least one of a lower surface of the second stopper 3930 and an upper surface of the second protrusion 4300 may be a rounded curved surface. The second stopper 3930 and the second protrusion portion 4300 may be in point or line contact with each other.

Accordingly, even when the second stopper 3930 and the second protrusion portion 4300 are in contact with each other, a rotational motion of the second frame 4000 may not be affected.

The second cover 3900 may further include a third stopper 3910 (see FIGS. 28A, 28B, and 29). The third stopper 3910 may be disposed in an edge region of the second cover 3900, and may include a third buffer portion 3910a, protruding upwardly of the second cover 3900, and a fourth buffer portion 3910b protruding downwardly of the second cover 3900.

The fourth buffer portion 3910b may limit a rotation range of the second frame 4000. The second frame 4000 may be configured to rotate relatively to the first frame 3000, and the fourth buffer portion 3910b may be provided on the second cover 3900 coupled to the first frame 3000. Accordingly, since the fourth buffer portion 3910b does not rotate about the second axis (the Y-axis) when the second frame 4000 rotates about the second axis (the Y-axis), the fourth buffer portion 3910b may interfere with the second frame 4000 and the fourth buffer portion 3910b may limit the rotation range of the second frame 4000.

In addition, the fourth buffer portion 3910b may reduce noise and impact when the second frame 4000 rotates about the second axis (the Y-axis) to collide with the third buffer unit 3910b.

The third buffer portion 3910a and/or the first buffer portion 3930a may limit the rotation range of the first frame 3000. The third buffer unit 3910a and/or the first buffer unit 3930a may be configured to rotate about the first axis (the X-axis) together with the first frame 3000, the rotation range of the first frame 3000 may be limited by interfering with the third buffer portion 3910a and/or the first buffer portion 3930a, and the first cover 1500 (coupled to the housing 1000, the fixed body 10) (see FIGS. 28a and 28b).

FIGS. 33A and 33B are cross-sectional views taken along line II-II of FIG. 22.

Referring to FIGS. 33A and 33B, the second frame 4000 may rotate about the second axis (the Y-axis). Since the lens module 2000 is provided in the second frame 4000, the lens module 2000 may rotate about the second axis (Y-axis) together with the second frame 4000.

Although not illustrated in FIGS. 33A and 33B, the lens module 2000 may be provided with an image sensor module 2500. The image sensor module 2500 may also rotate together with the lens module 2000.

The image sensor module 2500 may be connected to a connection substrate 9000, and the connection substrate 9000 may be configured to be partially moved or bent in a vertical direction as the image sensor module 2500 rotates. The configuration of the connection substrate portion 9000 will be described later with reference to FIGS. 34 to 37B.

The camera module 2 according to another example may be configured such that a relative position between the second magnet 6100 and the second coil 6300 of the second driving portion 6000 (for example, a facing distance therebetween or a spaced distance therebetween in the second axis (Y-axis) direction) is not changed when the first movable body 30 and the second movable body 50 rotate about the first axis (the X-axis).

For example, since the second magnet 6100 is provided on the second frame 4000 and the second coil 6300 is provided on the second substrate 8300 mounted on the first frame 3000, the second magnet 6100 and the second coil 6300 may also rotate together as the first frame 3000 and the second frame 4000 rotate about the first axis (the X-axis).

Accordingly, even when the first movable body 30 and the second movable body 50 rotate about the first axis (the X-axis) due to the first driving unit 5000, a spaced distance between the second magnet 6100 and the second coil 6300 in the second axis (Y-axis) direction is not changed.

In addition, the camera module 2 according to another example may be configured such that a relative position between the first magnet 5100 of the first driving unit 5000 and the first coil 5300 (for example, a facing distance therebetween or a spaced distance therebetween in the first axis (X-axis) direction) is not changed when the second movable body 50 rotates about the second axis (the Y-axis).

For example, since the second magnet 6100 rotates together with the second frame 4000 and the first driving unit 5000 does not rotate about the second axis (the Y-axis) when the second frame 4000 rotates about the second axis (the Y-axis), a spaced distance between the first magnet 5100 and the first coil 5300 in the first axis (the X-axis) is not changed.

As a result, a motion of rotation about each axis may be precisely controlled.

Figure 34:
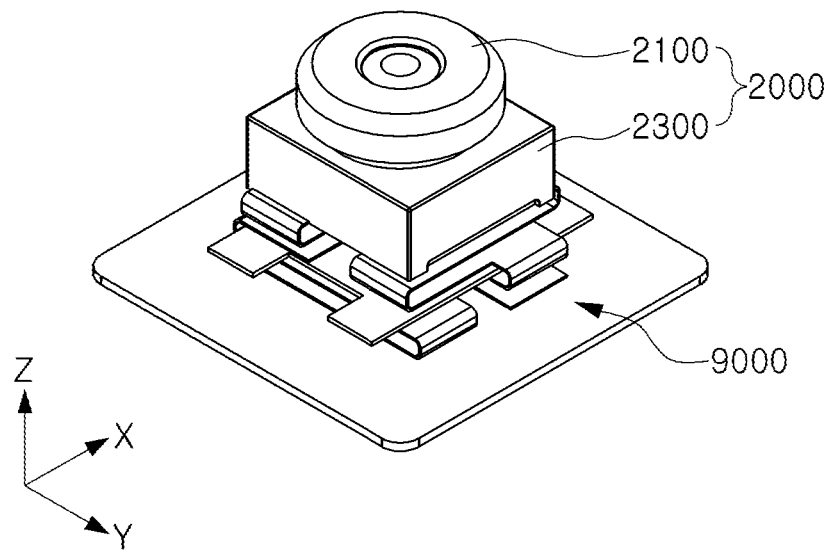
FIG. 34 is a perspective view illustrating that a lens module and a connection substrate portion are coupled to each other.
Figure 35:
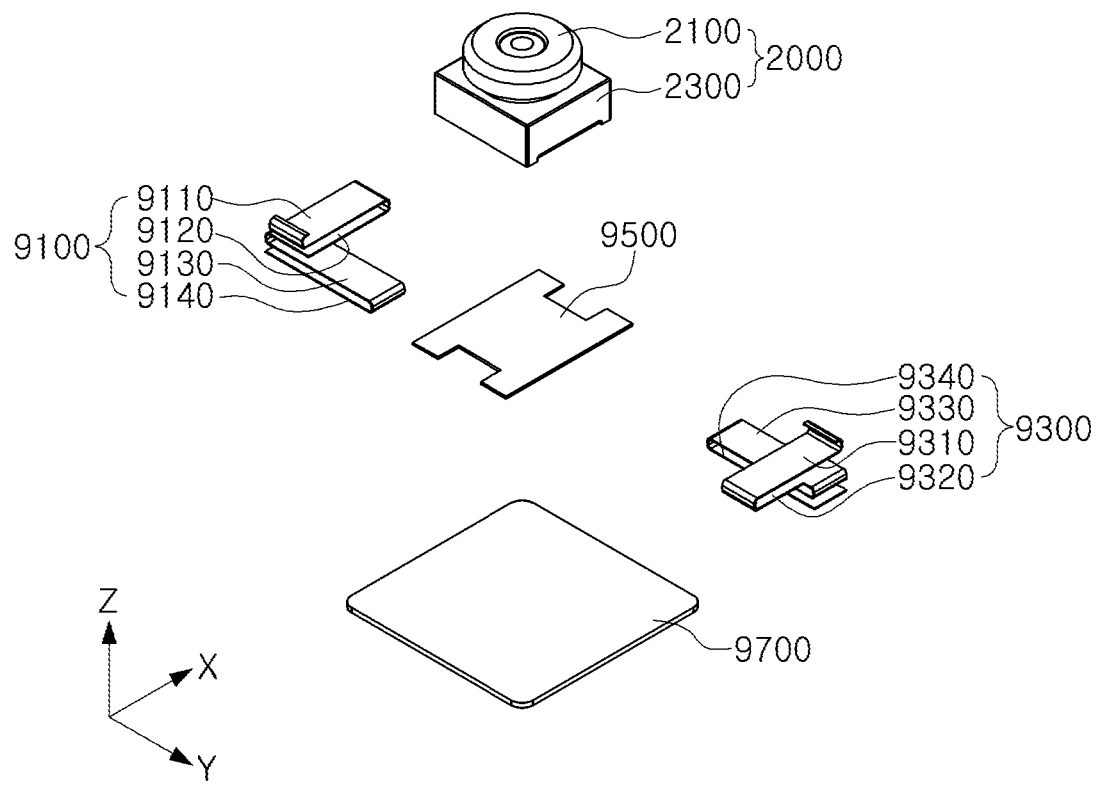
FIG. 35 is an exploded perspective view of the lens module and the connection substrate portion.

FIG. 34 is a perspective view illustrating that a lens module and a connection substrate portion are coupled to each other, and FIG. 35 is an exploded perspective view of the lens module and the connection substrate portion.

Figure 36A:
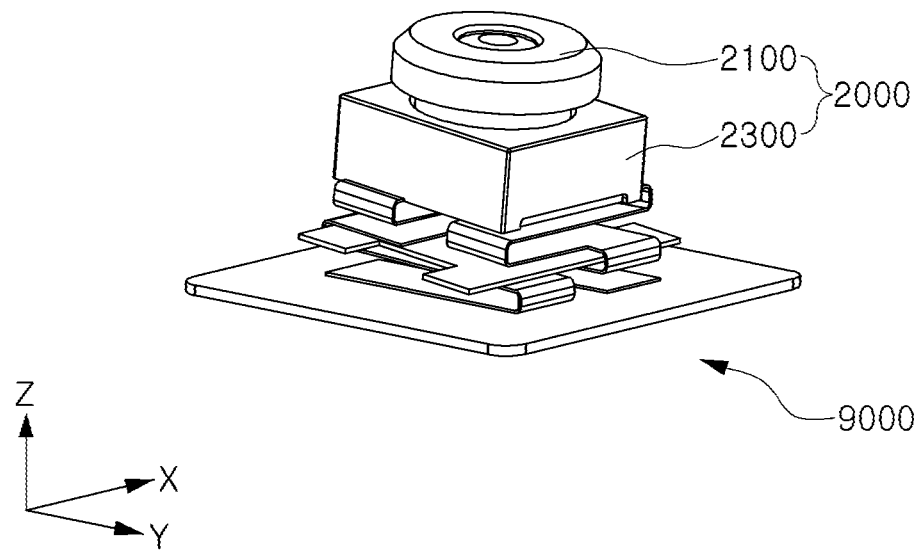
FIGS. 36A and 36B are views illustrating that the lens module rotates about a first axis.
Figure 36B:
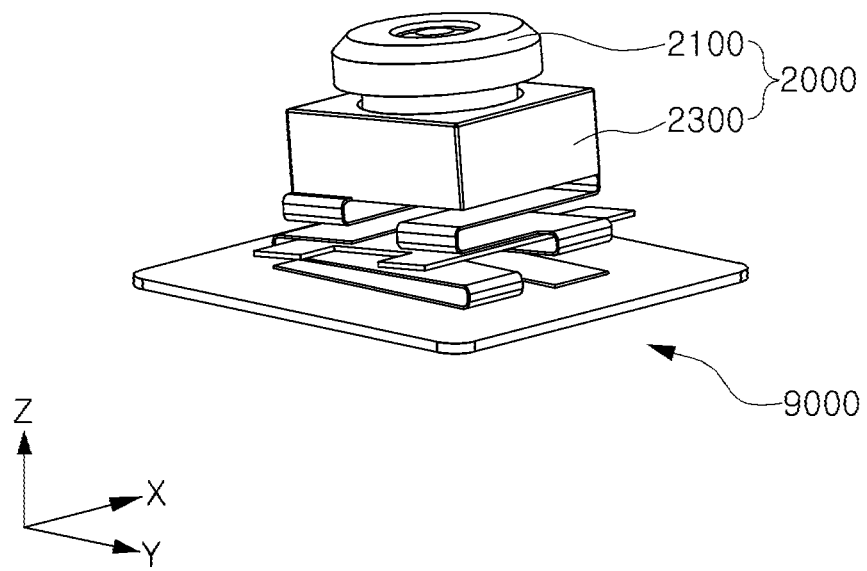
Figure 37A:
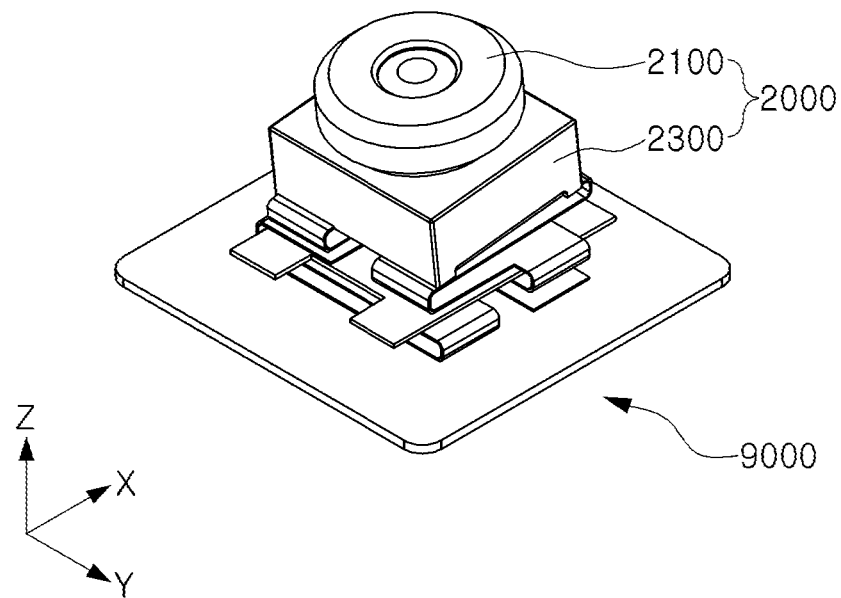
FIGS. 37A and 37B are views illustrating that the lens module rotates about a second axis.
Figure 37B:
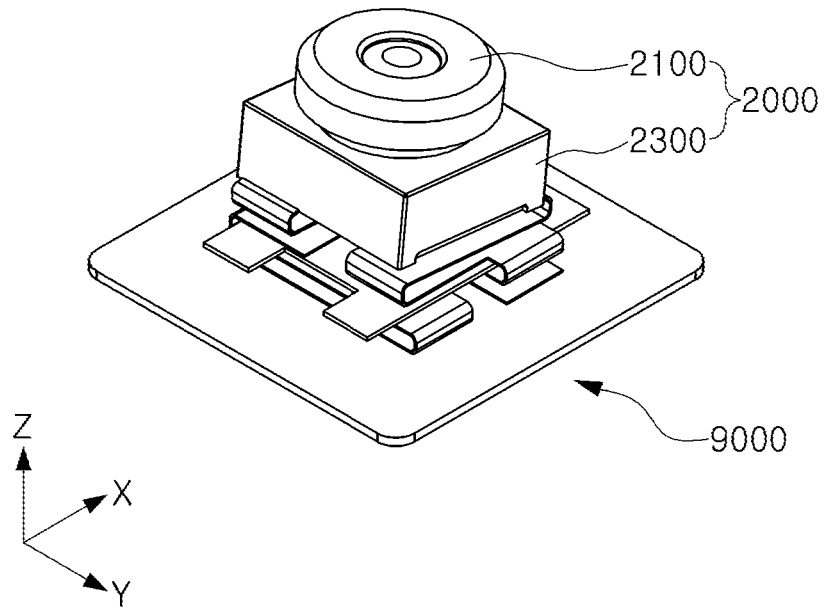

FIGS. 36A and 36B are views illustrating that the lens module rotates about a first axis, and FIGS. 37A and 37B are views illustrating that the lens module rotates about a second axis.

For ease of description, only the lens module 2000 and the connection substrate portion 9000 are briefly illustrated in FIGS. 34 to 37B.

Referring to FIGS. 34 and 35, the lens module 2000 may be connected to the connection substrate portion 9000. For example, the image sensor module 2500 provided below the lens module 2000 may be connected to the connection substrate portion 9000.

The connection substrate portion 9000 may include a first flexible substrate 9100, a second flexible substrate 9300, a support plate 9500, and a connection substrate 9700.

The first flexible substrate 9100 may be a flexible circuit board and may have a curved shape. For example, the first flexible substrate 9100 may have a bent shape.

The first flexible substrate 9100 may have a first flexible portion 9110, a first support portion 9120, a second flexible portion 9130, and a second support portion 9140.

The first flexible portion 9110 may be disposed to be spaced apart from the lens module 2000 in the optical axis (Z-axis) direction. One end of the first flexible portion 9110 may be connected to one side of the lens module 2000. The first flexible portion 9110 may extend from one side of the lens module 2000 to the other side of the lens module 2000 in the first axis (X-axis) direction.

One end of the first flexible portion 9110 may be curved to be connected to the lens module 2000. The first flexible portion 9110 may have a shape having a length in the first axis (X-axis) direction.

The first support portion 9120 may be bent from the other end of the first flexible portion 9110 and extend to a side of one end of the first flexible portion 9110. The first support portion 9120 may also have a shape having a length in the first axis (X-axis) direction.

The second flexible portion 9130 may be bent from the first support portion 9120 and extend in the second axis (Y-axis) direction. One end of the second flexible portion 9130 may be curved to be connected to the first support portion 9120. The second flexible portion 9130 may have a shape having a length in the second axis (Y-axis) direction.

The second support portion 9140 may be bent from the other end of the second flexible portion 9130 and extend to a side of one end side of the second flexible portion 9130. The second support portion 9140 may also have a shape having a length in the second axis (Y-axis) direction.

Each of the first flexible portion 9110 and the first support 9120 may have a shape having a length in the first axis (X-axis) direction, and each of the second flexible portion 9130 and the second support 9140 may have a shape having a length in the second axis (Y-axis) direction.

For example, the first flexible portion 9110 and the first support 9120, and the second flexible portion 9130 and the second support 9140 may have lengths in directions, perpendicular to each other.

The first flexible portion 9110, the first support portion 9120, the second flexible portion 9130, and the second support portion 9140 may be disposed to be spaced apart from each other in the optical axis (Z-axis) direction.

The second flexible substrate 9300 may be a flexible circuit board and may have a curved shape. As an example, the second flexible substrate 9300 may have a bent shape.

The second flexible substrate 9300 may be connected to the other side of the lens module 2000 and may have a shape corresponding to the first flexible substrate 9100. For example, similarly to the first flexible substrate 9100, the second flexible substrate 9300 may also include a first flexible portion 9310, a first support 9320, a second flexible portion 9330, and a second support 9340.

The support plate 9500 may be coupled to the first support portion 9120 of the first flexible substrate 9100 and the first support portion 9320 of the second flexible substrate 9300. In addition, the connection substrate 9700 may be coupled to the second support 9140 of the first flexible substrate 9100 and the second support 9340 of the second flexible substrate 9300. The connection substrate 9700 may be provided with a connector connected to an external terminal.

A configuration of each of the first flexible substrate 9100 and the second flexible substrate 9300 may a shape of a flexible film, on which a conductive material is patterned, or a shape in which a plurality of cables is extended.

When the lens module 2000 rotates about the first axis (the X-axis), the support plate 9500 may also rotate. In this case, the second flexible portions 9130 and 9330 may be vertically moved or bent (see FIGS. 36A and 36B).

When the lens module 2000 rotates about the second axis (the Y-axis), the first flexible portion may be vertically moved or bent (see FIGS. 37A and 37B).

Therefore, even when the lens module 2000 rotates about the first axis (X-axis) and the second axis (Y-axis), a signal may be stably transmitted to and received from a portable electronic device.

The camera module according to another example may include the connection substrate portion 700 described with reference to FIGS. 17 to 19, rather than the connection substrate portion 9000 described with reference to FIGS. 34 and 35.

As described above, a camera module according to an example and a portable electronic device including the same may track a moving subject.

While specific examples have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a lens module;
   a first frame accommodating the lens module;
   a second frame accommodating the first frame;
   a housing accommodating the second frame; and
   a first driving portion disposed between the first frame and the second frame,
   wherein the lens module and the first frame are configured to be rotatable about a first axis, with respect to the second frame, perpendicular to an optical axis,
   the lens module, the first frame, and the second frame are configured to be rotatable about a second axis, with respect to the housing, perpendicular to both the optical axis and the first axis,
   a first ball member is disposed between the first frame and the second frame and elastically supported in a direction of the first axis,
   a second ball member is disposed between the second frame and the housing and elastically supported in a direction of the second axis,
   the first driving portion comprises two first magnets, disposed on the first frame, and two first coils and a first position measurement unit disposed to face the first magnets,
   each of the first magnets has an internal side surface, facing the first axis, and an external side surface opposing the internal side surface, and
   the internal side surface and the external side surface of each of the first magnets are rounded such that a first inscribed circle, in contact with the internal side surface of each of the first magnets, and a first circumscribed circle, in contact with the external side surface of each of the first magnets, are concentric circles.

2. The camera module of claim 1, further comprising:
   a connection substrate portion having a first part coupled to the housing and a second part coupled to the lens module,
   wherein at least a portion of the connection substrate portion is flexibly configured to support a rotation of the lens module.

3. The camera module of claim 2, wherein the connection substrate portion comprises a first base substrate coupled to the housing, a second base substrate coupled to the lens module, and a connection substrate connecting the first base substrate to the second base substrate, and
   the connection substrate is configured to surround at least three side surfaces of the second substrate when viewed in a direction of the optical axis.

4. The camera module of claim 3, wherein the second base substrate is disposed above the first base substrate in the direction of the optical axis, and at least a portion of the connection substrate is inclined.

5. The camera module of claim 3, wherein the connection substrate comprises a plurality of layers disposed spaced apart from each other in the direction of the optical axis.

6. The camera module of claim 3, wherein the connection substrate comprises a first extension portion, a branch portion, a second extension portion, and a bent portion, and
   the first extension portion extends from the second base substrate, the branch portion extends from both sides of the first extension portion, the second extension portion extends from the branch portion, and the bent portion has a bent shape, extends from the second extension portion, and is connected to the first base substrate.

7. The camera module of claim 1, wherein a first support member is disposed in the first frame, a first damper member is disposed in the second frame, and the first ball member is pressed between the first support member and the first damper member, and
   a second support member is disposed in the second frame, a second damper member is disposed in the housing, and the second ball member is pressed between the second support member and the second damper member.

8. The camera module of claim 7, wherein each of the first damper member and the second damper member comprises a buffer portion having elastic force.

9. The camera module of claim 7, wherein each of the first support member and the second support member comprises a metal material,
   a first accommodation groove, accommodating the first ball member, extends from the first support member, and
   a second accommodation groove, accommodating the second ball member, extends from the second support member.

10. The camera module of claim 9, wherein the first support member is integrated with the first frame such that the first accommodation groove is exposed outwardly of the first frame, and the second support member is integrated with the second frame such that the second accommodation groove is exposed outwardly of the second frame.

11. The camera module of claim 1, wherein a first substrate is mounted on the second frame, and the first coils are disposed on the first substrate, and
    the first substrate comprises a connection portion for electrical connection to an external substrate, and the connection portion is bent.

12. The camera module of claim 1, further comprising a second driving portion disposed between the second frame and the housing,
    the second driving portion comprises two second magnets, disposed on one side of the second frame, and two second coils facing the second magnets,
    each of the second magnets has an internal side surface, facing the second axis, and an external side surface opposing the internal side surface, and
    the internal side surface and the external side surface of each of the second magnets are rounded such that a first inscribed circle, in contact with the internal side surface of each of the second magnets, and a first circumscribed circle, in contact with the external side surface of each of the second magnets, are concentric circles.

13. The camera module of claim 12, wherein a second substrate is mounted on the housing, and the second coils are disposed on the second substrate.

14. The camera module of claim 1, wherein the lens module comprises an image sensor having a rectangular shape, and
    a rotation range of the lens module when a minor axis is a rotation axis of the image sensor is wider than a rotation range when a major axis of the image sensor is a rotation axis of the image sensor.

15. The camera module of claim 14, wherein the major axis is formed in the direction of the first axis, and the minor axis is formed in the direction of the second axis, and the rotation range of the lens module when the first axis is the rotation axis is ±7 degrees, and the rotation range of the lens module when the second axis is the rotation axis is ±15 degrees.

16. A portable electronic device comprising:
a first camera module; and
a second camera module disposed to be spaced apart from the first camera module,
wherein the first camera module has a field of view narrower than a field of view of the second camera module, and
wherein the first camera module comprises:
a lens module;
a first frame accommodating the lens module;
a second frame accommodating the first frame;
a housing accommodating the second frame; and
a first driving portion disposed between the first frame and the second frame,
wherein the lens module and the first frame are configured to be rotatable about a first axis, with respect to the second frame, perpendicular to an optical axis,
the lens module, the first frame, and the second frame are configured to be rotatable about a second axis, with respect to the housing, perpendicular to both the optical axis and the first axis,
a first ball member is disposed between the first frame and the second frame and pressed in a direction of the first axis,
a second ball member is provided between the second frame and the housing and pressed in a direction of the second axis,
the first driving portion comprises two first magnets, disposed on the first frame, and two first coils and a first position measurement unit disposed to face the first magnets,
each of the first magnets has an internal side surface, facing the first axis, and an external side surface opposing the internal side surface, and
the internal side surface and the external side surface of each of the first magnets are rounded such that a first inscribed circle, in contact with the internal side surface of each of the first magnets, and a first circumscribed circle, in contact with the external side surface of each of the first magnets, are concentric circles.

17. The portable electronic device of claim 16, wherein the lens module comprises an image sensor having a rectangular shape, and
a rotation range of the lens module when a minor axis is a rotation axis of the image sensor is wider than a rotation range when a major axis of the image sensor is a rotation axis of the image sensor.

18. A camera module comprising:
a fixed body;
a first movable body disposed in the fixed body and configured to rotate about a first axis that is perpendicular to an optical axis;
a second movable body including at least one lens, the second movable body being disposed in the first movable body and configured to rotate about a second axis that is perpendicular to the first axis and the optical axis, and configured to be rotated together with the first movable body about the first axis;
a first ball member disposed between the fixed body and the first movable body and configured to maintain contact with the fixed body and the first movable body; and
a second ball member disposed between the first movable body and the second movable body and configured to maintain contact with the fixed body and the first movable body; and
a first driving portion disposed between the first movable body and the second movable body, wherein
the first driving portion comprises two first magnets, disposed on the first movable body, and two first coils and a first position measurement unit disposed to face the first magnets,
each of the first magnets has an internal side surface, facing the first axis, and an external side surface opposing the internal side surface, and
the internal side surface and the external side surface of each of the first magnets are rounded such that a first inscribed circle, in contact with the internal side surface of each of the first magnets, and a first circumscribed circle, in contact with the external side surface of each of the first magnets, are concentric circles.

19. The camera module of claim 18, further comprising a first cover coupled to the fixed body, the first cover comprising a first elastic member configured to contact the first movable body to allow the first ball member to maintain contact with the fixed body and the first movable body.

20. The camera module of claim 19, further comprising a second cover coupled to the first movable body, the second cover comprising a second elastic member configured to contact the second movable body to allow the second ball member to maintain contact with the first movable body and the second movable body.

* * * * *